(12) United States Patent
Mori et al.

(10) Patent No.: US 10,870,463 B2
(45) Date of Patent: Dec. 22, 2020

(54) HYDRAULIC OPERATING DEVICE

(71) Applicant: SHIMANO INC., Sakai (JP)

(72) Inventors: Kazuma Mori, Sakai (JP); Takuma Sakai, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 52 days.

(21) Appl. No.: 16/114,142

(22) Filed: Aug. 27, 2018

(65) Prior Publication Data
US 2020/0062336 A1  Feb. 27, 2020

(51) Int. Cl.
| B62L 3/02 | (2006.01) |
| B62K 23/06 | (2006.01) |
| B60T 11/16 | (2006.01) |
| B60T 7/10 | (2006.01) |
| F16D 55/228 | (2006.01) |
| B60T 17/04 | (2006.01) |

(52) U.S. Cl.
CPC .............. *B62L 3/023* (2013.01); *B60T 7/102* (2013.01); *B60T 11/16* (2013.01); *B60T 17/043* (2013.01); *B62K 23/06* (2013.01); *F16D 55/228* (2013.01)

(58) Field of Classification Search
CPC .. B62L 3/023; B62L 1/005; B62L 3/00; B60T 7/102; B60T 11/18; B60T 17/043; B60T 11/224; B60T 17/04; B60T 11/102; B60T 13/686; B60T 13/745; B60T 8/3685; B62K 23/06; B62K 19/38; B62K 21/12; B62K 23/02; F16D 2121/02; F16D 55/228; F16D 2125/16; F16D 55/2255; F16D 55/226; F16D 55/32; F16D 65/14
See application file for complete search history.

(56) References Cited

U.S. PATENT DOCUMENTS

| 4,223,533 A | * | 9/1980 | Valentin | .................... F15B 7/10 60/547.1 |
| 7,722,130 B2 | * | 5/2010 | Takeuchi | ................ B62L 3/023 188/106 P |
| 7,757,821 B2 | * | 7/2010 | Tetsuka | ................... B62L 3/023 188/26 |

(Continued)

FOREIGN PATENT DOCUMENTS

| DE | 202014000348 U1 | * | 1/2014 |
| DE | 202014000348 U1 | | 4/2014 |

*Primary Examiner* — Bradley T King
*Assistant Examiner* — Mahbubur Rashid
(74) *Attorney, Agent, or Firm* — Mori & Ward, LLP

(57) ABSTRACT

A hydraulic operating device comprises a base member, an operating member, a piston, and a mounting member. The base member includes a cylinder bore, a first hose-attachment hole, and a second hose-attachment hole. The first hose-attachment hole is configured to be in fluid communication with the cylinder bore. The second hose-attachment hole is configured to be in fluid communication with the cylinder bore. The mounting member includes a mount opening through which the handlebar is to extend. The mount opening has a mount center axis. The base member includes a support portion configured to contact an outer circumferential surface of the handlebar without clamping the handlebar in a mounting state where the handlebar extends through the mount opening of the mounting member.

21 Claims, 18 Drawing Sheets

(56) References Cited

U.S. PATENT DOCUMENTS

| | | | | |
|---|---|---|---|---|
| 8,061,667 | B2* | 11/2011 | Weiss | B62K 23/06 |
| | | | | 248/229.13 |
| 8,096,921 | B2* | 1/2012 | Hahn | B60K 23/02 |
| | | | | 192/114 R |
| 8,646,353 | B2* | 2/2014 | Uno | B60T 7/102 |
| | | | | 188/24.11 |
| 8,776,966 | B2* | 7/2014 | Hirose | B60T 7/102 |
| | | | | 188/344 |
| 8,814,063 | B1* | 8/2014 | Millan | A45F 3/18 |
| | | | | 239/289 |
| 8,905,205 | B2* | 12/2014 | Matsushita | B62K 23/06 |
| | | | | 188/344 |
| 9,233,730 | B2* | 1/2016 | Kariyama | B62L 3/023 |
| 9,321,501 | B1* | 4/2016 | Miki | B62K 23/06 |
| 9,550,544 | B2* | 1/2017 | Takeuchi | B62K 23/06 |
| 9,550,546 | B2* | 1/2017 | Kariyama | B62L 3/023 |
| 2004/0163897 | A1* | 8/2004 | Becocci | B60T 11/046 |
| | | | | 188/24.22 |
| 2010/0139442 | A1* | 6/2010 | Tsumiyama | B62M 25/04 |
| | | | | 74/502.2 |
| 2011/0240425 | A1* | 10/2011 | Hirose | B60T 7/102 |
| | | | | 188/344 |
| 2014/0038757 | A1 | 2/2014 | Kariyama et al. | |
| 2015/0367908 | A1* | 12/2015 | Kariyama | B60T 17/04 |
| | | | | 188/72.4 |
| 2016/0200390 | A1* | 7/2016 | Carrasco Vergara | B62L 3/023 |
| | | | | 60/594 |
| 2016/0257372 | A1* | 9/2016 | Nakai | B60T 11/22 |
| 2017/0259877 | A1* | 9/2017 | Thompson | B60T 11/16 |
| 2018/0043962 | A1* | 2/2018 | Ng | B62M 25/04 |
| 2018/0141611 | A1* | 5/2018 | Komada | B62M 25/08 |
| 2018/0274562 | A1* | 9/2018 | Chambers | B62M 25/08 |

* cited by examiner

HYDRAULIC OPERATING DEVICE

BACKGROUND OF THE INVENTION

Field of the Invention

The present invention relates to a hydraulic operating device.

Discussion of the Background

A human-powered vehicle includes a hydraulic system configured to operate a hydraulic component.

SUMMARY OF THE INVENTION

In accordance with a first aspect of the present invention, a hydraulic operating device comprises a base member, an operating member, a piston, and a mounting member. The base member includes a cylinder bore, a first hose-attachment hole, and a second hose-attachment hole. The first hose-attachment hole is configured to be in fluid communication with the cylinder bore. The second hose-attachment hole is configured to be in fluid communication with the cylinder bore. The operating member includes a proximal end portion and a distal end portion opposite to the proximal end portion. The operating member is pivotally coupled to the base member at the proximal end portion about a pivot axis. The piston is movably provided in the cylinder bore and operatively coupled to the operating member to move relative to the base member in response to a pivotal movement of the operating member. The mounting member is configured to couple the base member to a handlebar. The mounting member includes a mount opening through which the handlebar is to extend. The mount opening has a mount center axis. The base member includes a support portion configured to contact an outer circumferential surface of the handlebar without clamping the handlebar in a mounting state where the handlebar extends through the mount opening of the mounting member.

With the hydraulic operating device according to the first aspect, the support portion can improve stability of the orientation of the base member relative to the handlebar in the mounting state.

In accordance with a second aspect of the present invention, the hydraulic operating device according to the first aspect is configured so that the support portion is provided between the mounting member and the distal end portion of the operating member in a mount axis direction parallel to the mount center axis.

With the hydraulic operating device according to the second aspect, the support portion can further improve stability of the orientation of the base member relative to the handlebar in the mounting state.

In accordance with a third aspect of the present invention, the hydraulic operating device according to the second aspect is configured so that the support portion is spaced apart from the mounting member in the mount axis direction as viewed along the pivot axis.

With the hydraulic operating device according to the third aspect, the support portion can further improve stability of the orientation of the base member relative to the handlebar in the mounting state.

In accordance with a fourth aspect of the present invention, the hydraulic operating device according to the second or third aspect is configured so that the first hose-attachment hole is provided between the mounting member and the support portion in the mount axis direction as viewed along the pivot axis.

With the hydraulic operating device according to the fourth aspect, it is possible to utilize a space between the mounting member and the support portion for the first hose-attachment hole.

In accordance with a fifth aspect of the present invention, the hydraulic operating device according to any one of the second to fourth aspects is configured so that the mounting member and first hose-attachment hole are provided between the second hose-attachment hole and the support portion in the mount axis direction as viewed along the pivot axis.

With the hydraulic operating device according to the fifth aspect, it is possible to utilize space between the second hose-attachment hole and the support portion for the mounting member and the first hose-attachment hole.

In accordance with a sixth aspect of the present invention, the hydraulic operating device according to any one of the first to fifth aspects is configured so that the support portion is closer to the mount center axis than the first hose-attachment hole and the second hose-attachment hole as viewed along the pivot axis.

With the hydraulic operating device according to the sixth aspect, it is possible to improve stability of the orientation of the base member relative to the handlebar in the mounting state with creating a space for the first hose-attachment hole and the second hose-attachment hole.

In accordance with a seventh aspect of the present invention, the hydraulic operating device according to any one of the first to sixth aspects is configured so that the first hose-attachment hole faces toward the support portion as viewed along the pivot axis.

With the hydraulic operating device according to the seventh aspect, it is possible to utilize a space around the support portion for the first hose-attachment hole and a first hydraulic hose connected to the first hose-attachment hole.

In accordance with an eighth aspect of the present invention, a hydraulic operating device comprises a base member, an operating member, and a piston. The base member includes a cylinder bore, a first hose-attachment hole, a second hose-attachment hole, and an additional hole. The first hose-attachment hole is configured to be in fluid communication with the cylinder bore. The second hose-attachment hole is configured to be in fluid communication with the cylinder bore. The additional hole is configured to be in fluid communication with the cylinder bore. The operating member is pivotally coupled to the base member about a pivot axis. The piston is movably provided in the cylinder bore and operatively coupled to the operating member to move relative to the base member in response to a pivotal movement of the operating member.

With the hydraulic operating device according to the eighth aspect, it is possible to utilize the additional hole as a bleeding port or other uses.

In accordance with a ninth aspect of the present invention, the hydraulic operating device according to the eighth aspect further comprises a mounting member configured to couple the base member to a handlebar. The mounting member includes a mount opening through which the handlebar is to extend. The mount opening has a mount center axis. The additional hole is provided between the first hose-attachment hole and the second hose-attachment hole in a mount axis direction parallel to the mount center axis as viewed along the pivot axis.

With the hydraulic operating device according to the ninth aspect, it is possible to effectively arrange the first hose-attachment hole, the second hose-attachment hole, and the additional hole.

In accordance with a tenth aspect of the present invention, the hydraulic operating device according to the eighth or ninth aspect is configured so that the first hose-attachment hole and the second hose-attachment hole are provided on a first axial side of the mount center axis in a pivot axis direction parallel to the pivot axis as viewed in the mount axis direction. The additional hole is provided on a second axial side of the mount center axis in the pivot axis direction as viewed in the mount axis direction. The second axial side is provided on an opposite side of the first axial side relative to the mount center axis in the pivot axis direction.

With the hydraulic operating device according to the tenth aspect, it is possible to more effectively arrange the first hose-attachment hole, the second hose-attachment hole, and the additional hole.

In accordance with an eleventh aspect of the present invention, the hydraulic operating device according to any one of the eighth to tenth aspects is configured so that the additional hole is provided between the first hose-attachment hole and the cylinder bore so as to fluidly connect the first hose-attachment hole to the cylinder bore.

With the hydraulic operating device according to the eleventh aspect, it is possible to utilize the additional hole as a passageway provided between the cylinder bore and the first hose-attachment hole.

In accordance with a twelfth aspect of the present invention, the hydraulic operating device according to any one of the eighth to eleventh aspects is configured so that the base member includes a connecting hole connecting the additional hole to the cylinder bore. The additional hole has a first diameter. The connecting hole has a second diameter smaller than the first diameter.

With the hydraulic operating device according to the twelfth aspect, it is possible to form the connecting hole through the additional hole.

In accordance with a thirteenth aspect of the present invention, the hydraulic operating device according to any one of the eighth to twelfth aspects further comprises a plug threadedly engaged with the additional hole.

With the hydraulic operating device according to the thirteenth aspect, it is possible to open and close the additional hole as necessary.

In accordance with a fourteenth aspect of the present invention, the hydraulic operating device according to any one of the eighth to thirteenth aspects further comprises a mounting member configured to couple the base member to a handlebar. The mounting member includes a mount opening through which the handlebar is to extend. The mount opening has a mount center axis. The operating member includes a proximal end portion and a distal end portion opposite to the proximal end portion. The operating member is pivotally coupled to the base member at the proximal end portion about the pivot axis. The base member includes a support portion provided between the mounting member and the distal end portion of the operating member in a mount axis direction parallel to the mount center axis. The support portion is configured to contact an outer circumferential surface of the handlebar without clamping the handlebar in a mounting state where the handlebar extends through the mount opening of the mounting member.

With the hydraulic operating device according to the fourteenth aspect, the support portion can improve stability of the orientation of the base member relative to the handlebar in the mounting state.

In accordance with a fifteenth aspect of the present invention, a hydraulic operating device comprises a base member, an operating member, a piston, and a mounting member. The base member includes a cylinder bore, a first hose-attachment hole, and a second hose-attachment hole. The first hose-attachment hole is configured to be in fluid communication with the cylinder bore. The second hose-attachment hole is configured to be in fluid communication with the cylinder bore. The operating member is pivotally coupled to the base member about a pivot axis. The piston is movably provided in the cylinder bore and is operatively coupled to the operating member to move relative to the base member in response to a pivotal movement of the operating member. The mounting member is configured to couple the base member to a handlebar. The mounting member includes a mount opening through which the handlebar is to extend. The mount opening has a mount center axis. The mounting member is provided between the first hose-attachment hole and the second hose-attachment hole in a mount axis direction parallel to the mount center axis as viewed along the pivot axis.

With the hydraulic operating device according to the fifteenth aspect, it is possible to utilize a space between the first hose-attachment hole and the second hose-attachment hole for the mounting member.

In accordance with a sixteenth aspect of the present invention, the hydraulic operating device according to the fifteenth aspect is configured so that the first hose-attachment hole is provided between the mount opening and the second hose-attachment hole in a perpendicular direction perpendicular to both the pivot axis and the mount center axis as viewed along the pivot axis.

With the hydraulic operating device according to the sixteenth aspect, it is possible to effectively utilize a space between the base member and the handlebar in the mounting state.

In accordance with a seventeenth aspect of the present invention, the hydraulic operating device according to the fifteenth or sixteenth aspect is configured so that the operating member includes a proximal end portion and a distal end portion opposite to the proximal end portion. The operating member is pivotally coupled to the base member at the proximal end portion about the pivot axis. The base member includes a support portion provided between the mounting member and the distal end portion of the operating member in a mount axis direction parallel to the mount center axis. The support portion is configured to contact an outer circumferential surface of the handlebar without clamping the handlebar in a mounting state where the handlebar extends through the mount opening of the mounting member.

With the hydraulic operating device according to the seventeenth aspect, the support portion can improve stability of the orientation of the base member relative to the handlebar in the mounting state.

In accordance with an eighteenth aspect of the present invention, the hydraulic operating device according to any one of the first to seventeenth aspects is configured so that the first hose-attachment hole is configured to be connected to an additional hydraulic operating device. The second hose-attachment hole is configured to be connected to a hydraulic operated device.

With the hydraulic operating device according to the eighteenth aspect, it is possible to operate the hydraulic operated device by using the hydraulic operating device and the additional hydraulic operating device.

In accordance with a nineteenth aspect of the present invention, the hydraulic operating device according to any one of the first to eighteenth aspects further comprises a first hose connector and a second hose connector. The first hose connector is configured to connect a first hydraulic hose to the first hose-attachment hole. The second hose connector is configured to connect a second hydraulic hose to the second hose-attachment hole.

With the hydraulic operating device according to the nineteenth aspect, it is possible to easily connect the first hydraulic hose to the first hose-attachment hole and easily connect the second hydraulic hose to the second hose-attachment hole.

In accordance with a twentieth aspect of the present invention, the hydraulic operating device according to the nineteenth aspect is configured so that the first hose-attachment hole includes a first threaded hole. The first hose connector includes a first threaded fastening sleeve threadedly engaged with the first threaded hole. The first hose connector includes a first tubular bushing through which the first hydraulic hose is to pass in the first hose-attachment hole. The first tubular bushing is configured to be deformed during installation of the first threaded fastening sleeve to the first threaded hole.

With the hydraulic operating device according to the twentieth aspect, it is possible to easily attach the first hydraulic hose to the first hose-attachment hole.

In accordance with a twenty-first aspect of the present invention, the hydraulic operating device according to the nineteenth or twentieth aspect is configured so that the second hose-attachment hole includes a second threaded hole. The second hose connector includes a second threaded fastening sleeve threadedly engaged with the second threaded hole. The second hose connector includes a second tubular bushing through which the second hydraulic hose is to pass in the second hose-attachment hole. The second tubular bushing is configured to be deformed during installation of the second threaded fastening sleeve to the second threaded hole.

With the hydraulic operating device according to the twenty-first aspect, it is possible to easily attach the second hydraulic hose to the second hose-attachment hole.

In accordance with a twenty-second aspect of the present invention, the hydraulic operating device according to any one of the first to twenty-first aspects further comprises an adjustment structure configured to adjust a rest position of the operating member with respect to the base member.

With the hydraulic operating device according to the twenty-second aspect, it is possible to adjust the rest position of the operating member to a position suitable for a user's hand.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
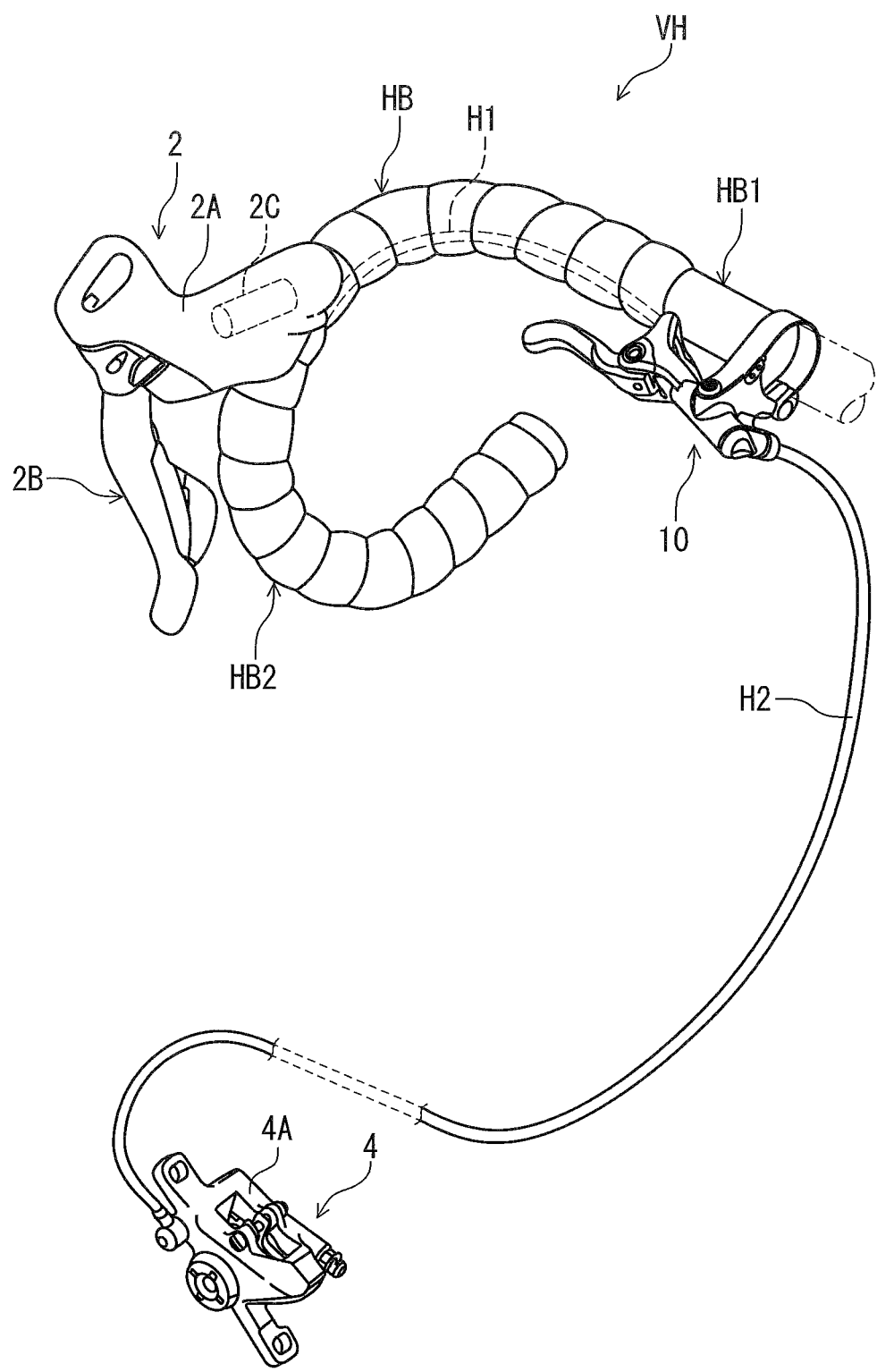
FIG. 1 is a schematic perspective view of a part of a human-powered vehicle including a hydraulic operating device in accordance with an embodiment.

The embodiment(s) will now be described with reference to the accompanying drawings, wherein like reference numerals designate corresponding or identical elements throughout the various drawings.

As seen in FIG. 1, a hydraulic operating device 10 is configured to be mounted to a handlebar HB of a human-powered vehicle VH. The hydraulic operating device 10 is configured to be connected to an additional hydraulic operating device 2 with a first hydraulic hose H1. The additional hydraulic operating device 2 is configured to be mounted to the handlebar HB. The hydraulic operating device 10 is configured to be connected to a hydraulic operated device 4 with a second hydraulic hose H2. The additional hydraulic operating device 2 is configured to operate the hydraulic operated device 4 via the hydraulic operating device 10. The hydraulic operating device 10 is configured to operate the hydraulic operated device 4. In this embodiment, the hydraulic operated device 4 is a disc brake caliper. However, the hydraulic operated device 4 is not limited to the brake caliper.

For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. For example, the human-powered vehicle VH can have a larger size than that of the four-wheeled automobile. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike.

In this embodiment, the handlebar HB is a drop-down handlebar and includes a straight part HB1 and a curved drop-down part HB2. The hydraulic operating device 10 is configured to be mounted to the straight part HB1. The additional hydraulic operating device 2 is configured to be mounted to the curved drop-down part HB2. However, the locations of the hydraulic operating device 10 and the additional hydraulic operating device 2 are not limited to this embodiment.

Figure 2:
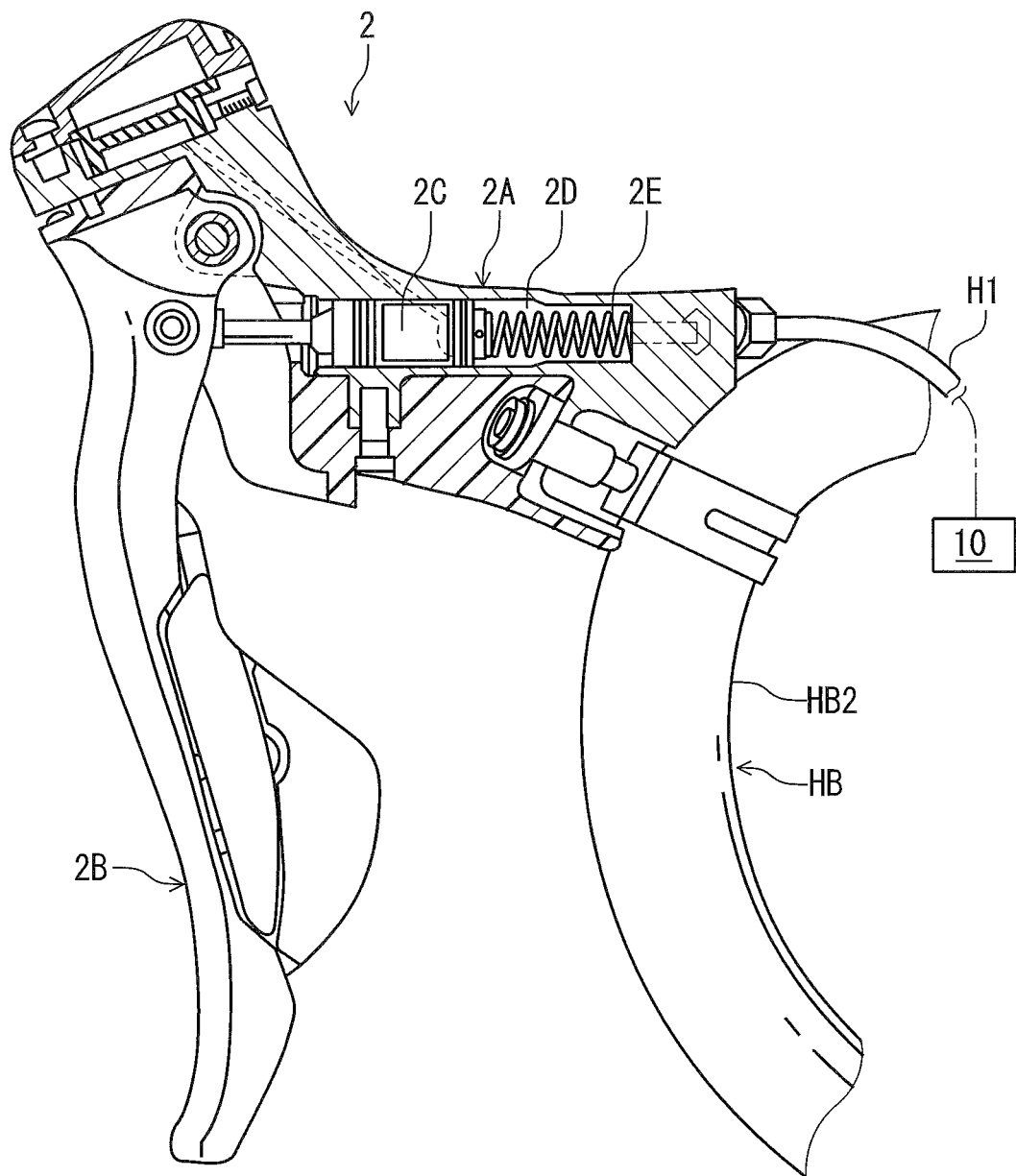
FIG. 2 is a cross-sectional view of an additional hydraulic operating device of the human-powered vehicle illustrated in FIG. 1.

As seen in FIG. 2, the additional hydraulic operating device 2 includes a bracket 2A, a lever 2B, a master piston 2C, and a master chamber 2D. The bracket 2A includes a master cylinder bore 2E. The lever 2B is pivotally coupled to the bracket 2A. The master piston 2C is movably provided in the master cylinder bore 2E and is coupled to the lever 2B. The master piston 2C and the master cylinder bore 2E define the master chamber 2D. The master chamber 2D is in fluid communication with the hydraulic operating device 10 with the first hydraulic hose H1. The additional hydraulic operating device 2 is configured to generate a hydraulic pressure in the master chamber 2D in response to a pivotal movement of the lever 2B relative to the bracket 2A.

Figure 3:
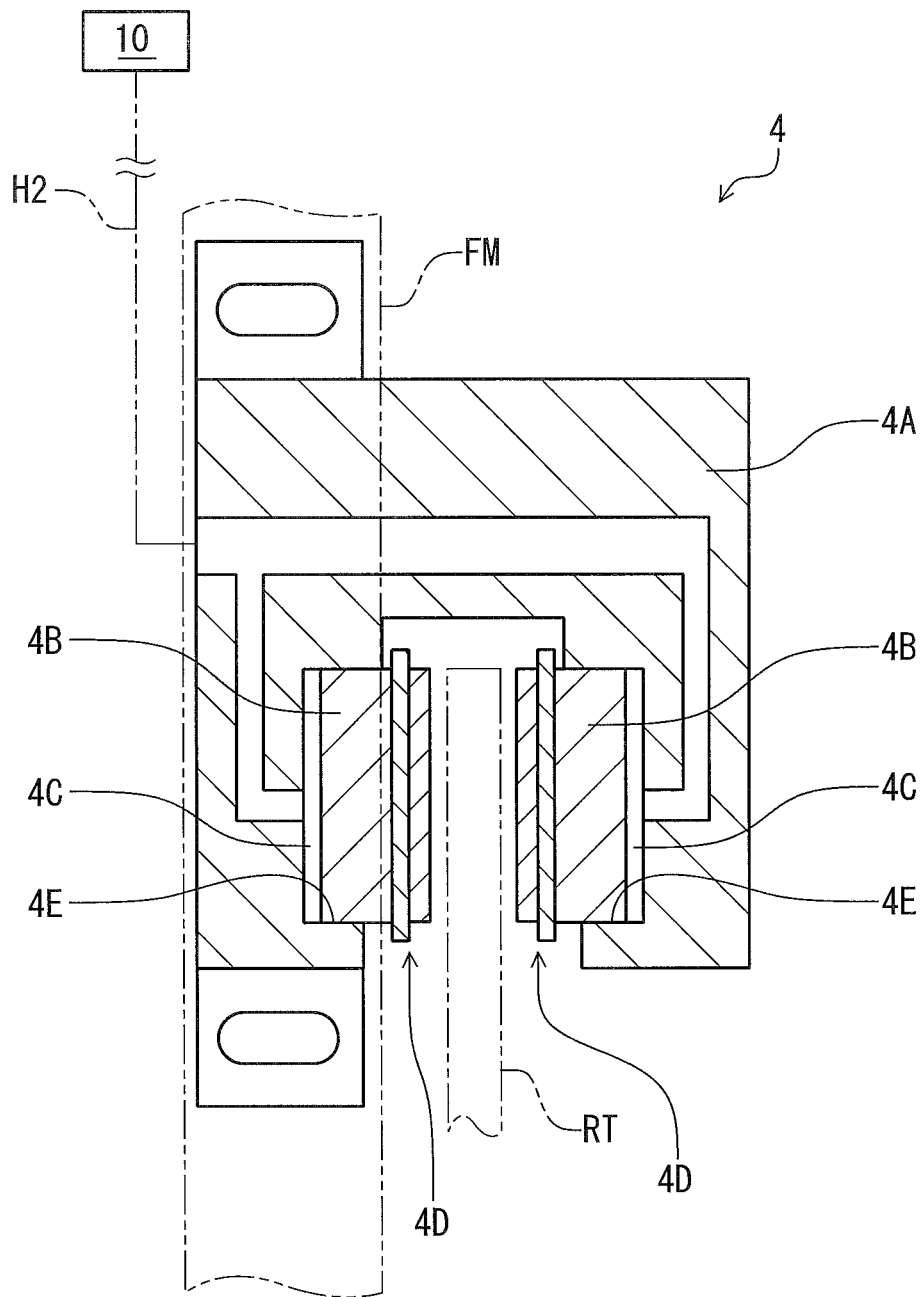
FIG. 3 is a cross-sectional view of a hydraulic operated device of the human-powered vehicle illustrated in FIG. 1.

As seen in FIG. 3, the hydraulic operated device 4 includes a caliper body 4A, a pair of slave pistons 4B, a pair of slave chambers 4C, a pair of friction members 4D. The caliper body 4A includes a pair of slave cylinder bores 4E and is secured to a frame FM. The slave piston 4B is movably provided in the slave cylinder bore 4E. The slave piston 4B and the slave cylinder bore 4E define the slave chamber 4C. The friction member 4D is movably attached to the caliper body 4A. The slave piston 4B presses the friction member 4D toward a disc brake rotor RT in response to a hydraulic pressure transmitted to the slave chamber 4C. The pair of slave chambers 4C is in fluid communication with the hydraulic operating device 10 with the second hydraulic hose H2.

Figure 4:
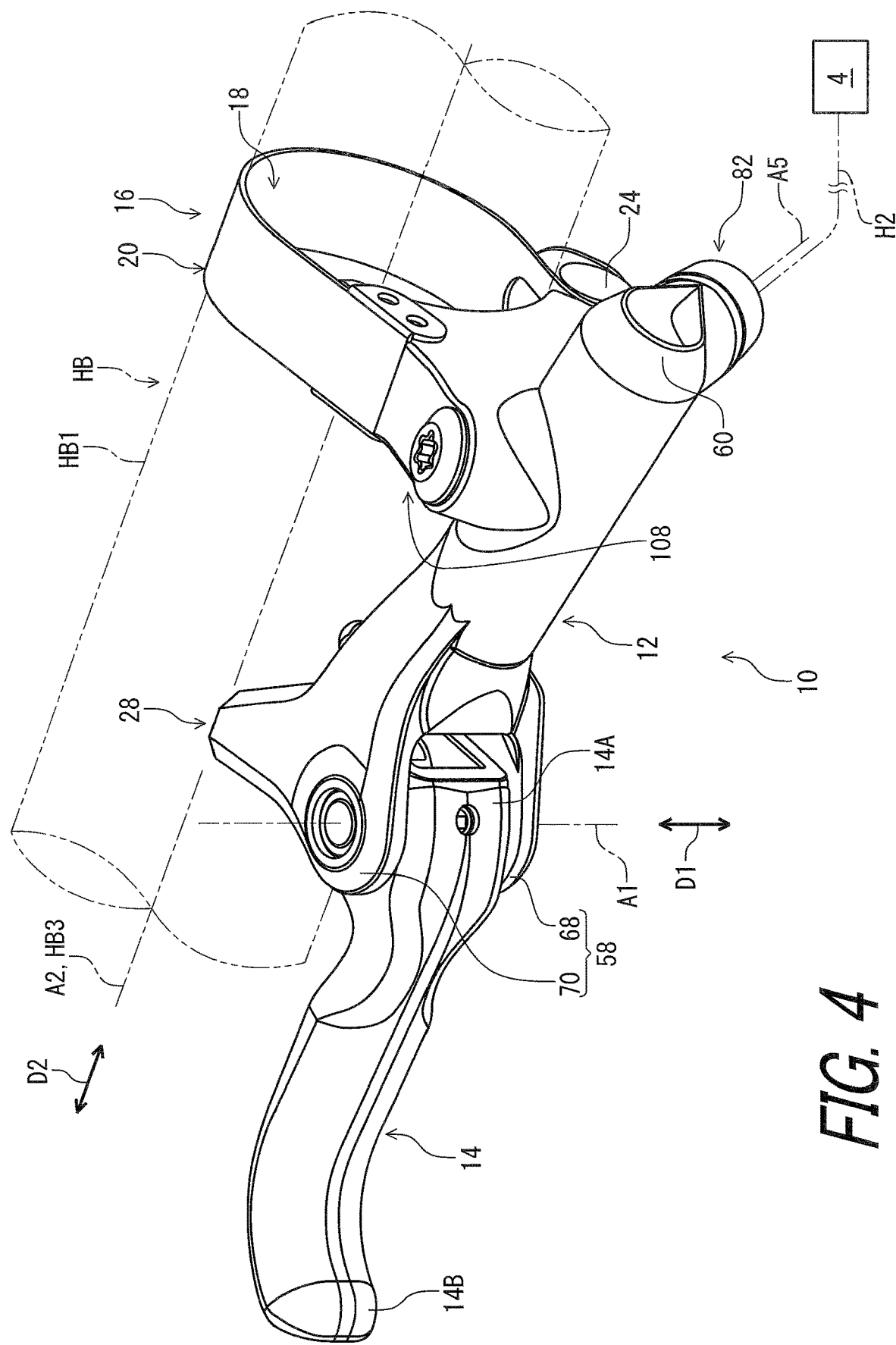
FIG. 4 is a perspective view of the hydraulic operating device of the human-powered vehicle illustrated in FIG. 1.

As seen in FIG. 4. the hydraulic operating device 10 comprises a base member 12 and an operating member 14. The operating member 14 is pivotally coupled to the base member 12 about a pivot axis A1. The operating member 14 is provided as a lever in this embodiment. The operating member 14 includes a proximal end portion 14A and a distal end portion 14B opposite to the proximal end portion 14A. The operating member 14 is pivotally coupled to the base member 12 at the proximal end portion 14A about the pivot axis A1. The operating member 14 extends from the proximal end portion 14A to the distal end portion 14B. The distal end portion 14B constitutes a free end of the operating member 14. A pivot axis direction D1 is defined to be parallel to the pivot axis A1.

Figure 5:
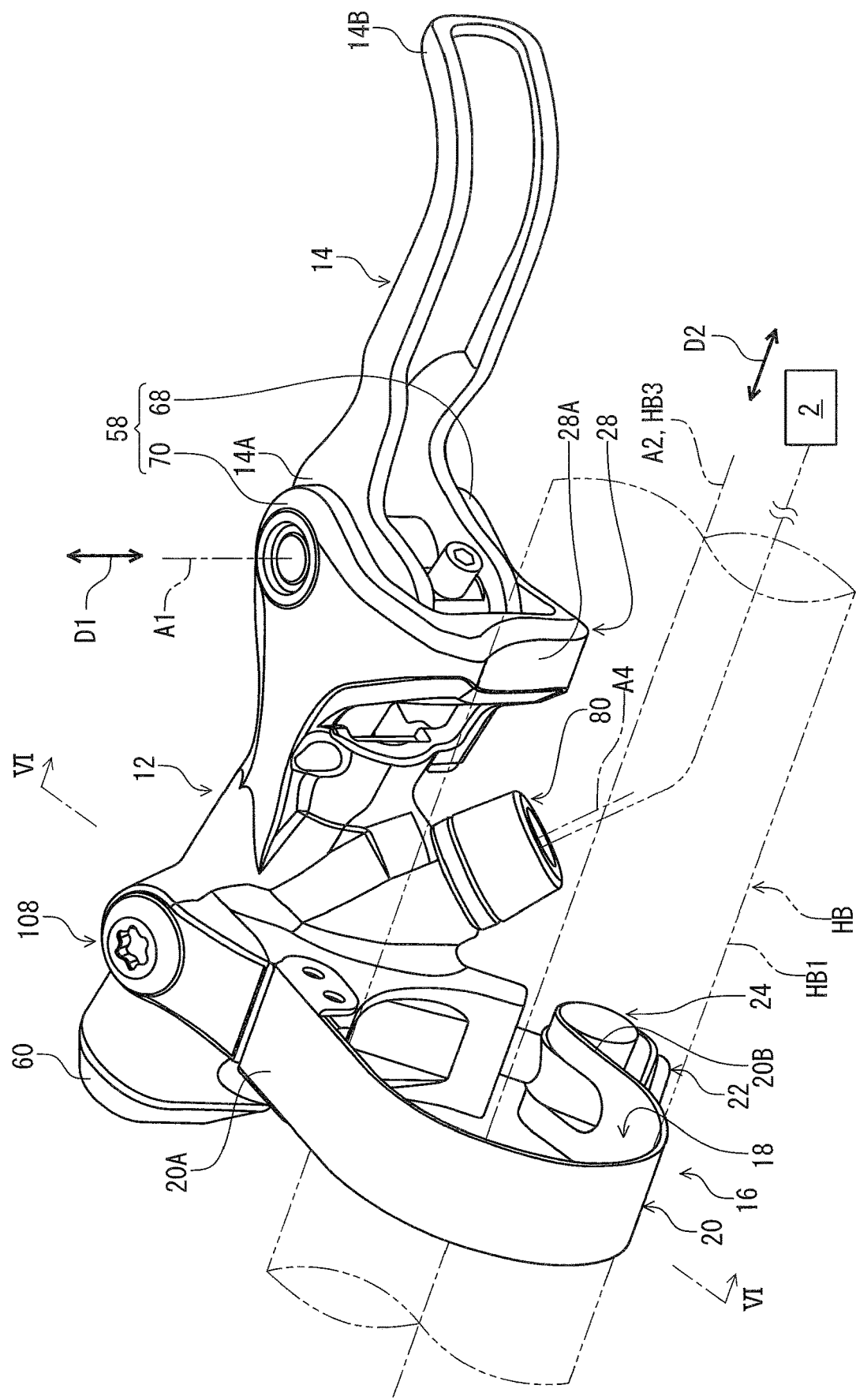
FIG. 5 is another perspective view of the hydraulic operating device of the human-powered vehicle illustrated in FIG. 1.

As seen in FIG. 5, the hydraulic operating device 10 comprises a mounting member 16. The mounting member 16 is configured to couple the base member 12 to the handlebar HB. The mounting member 16 includes a mount opening 18 through which the handlebar HB is to extend. The mount opening 18 has a mount center axis A2. The straight part HB1 of the handlebar HB has a longitudinal center axis HB3. The mount center axis A2 is coincident with the longitudinal center axis HB3 as the mounting member 16 couples the base member 12 to the handlebar HB.

In this embodiment, the mounting member 16 includes a clamp band 20, a clamp bolt 22, and an intermediate member 24. The clamp band 20 includes a first band end portion 20A and a second band end portion 20B. The first band end portion 20A is secured to the base member 12. The second band end portion 20B is coupled to the intermediate member 24. The clamp band 20 is made of a deformable material. In this embodiment, the clamp band is made of a thin metallic material, e.g., steel, stainless steel, or aluminum alloy. A thickness of the clamp band 20 in a radial direction of the mount opening 18 is equal to or less than 2 mm. Preferably, the thickness of the clamp band 20 ranges from 1 mm to 0.3 mm. In this embodiment, the thickness of the clamp band 20 is set as 0.6 mm. The clamp bolt 22 is rotatably attached to the base member 12 to change a position of the intermediate member 24 relative to the base member 12.

Figure 6:
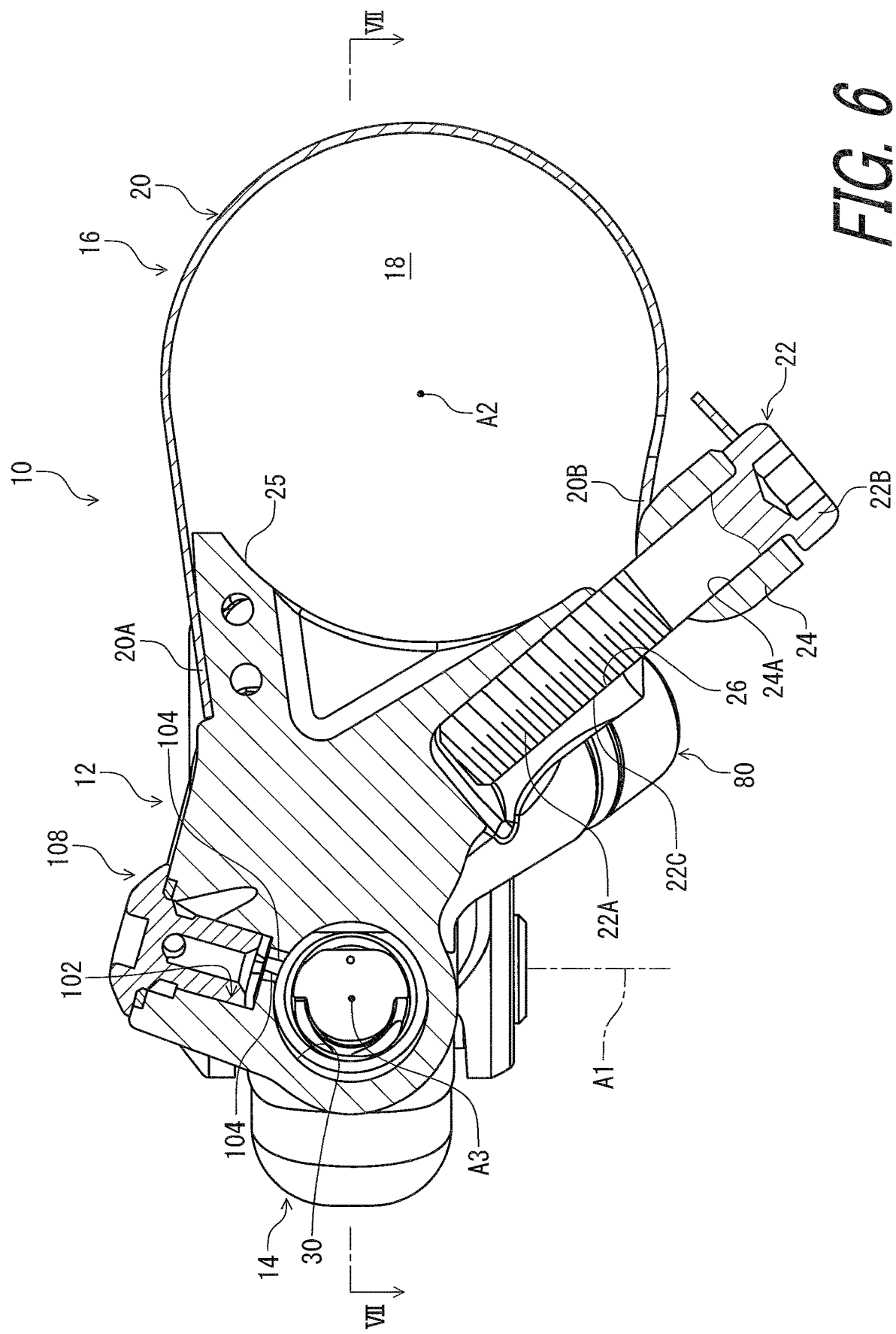
FIG. 6 is a cross-sectional view of the hydraulic operating device taken along line VI-VI of FIG. 5.

As seen in FIG. 6, the base member 12 includes a mounting contact surface 25 and a clamp threaded hole 26. The mounting contact surface 25 has a curved shape extending along an outer circumferential surface of the handlebar HB. The clamp band 20 and the mounting contact surface 25 define the mount opening 18. The clamp bolt 22 includes a rod 22A and a bolt head 22B provided at an end of the rod 22A. The rod 22A includes an external thread 22C threadedly engaged with the clamp threaded hole 26. The intermediate member 24 includes a through-hole 24A. The clamp bolt 22 extends through the through-hole 24A of the intermediate member 24. The intermediate member 24 is in contact with the bolt head 22B. Rotation of the clamp bolt 22 relative to the base member 12 deforms the clamp band 20 such that the position of the intermediate member 24 relative to the base member 12 is changed and the handlebar HB is clamped by the clamp band 20 and the mounting contact surface 25.

Figure 7:
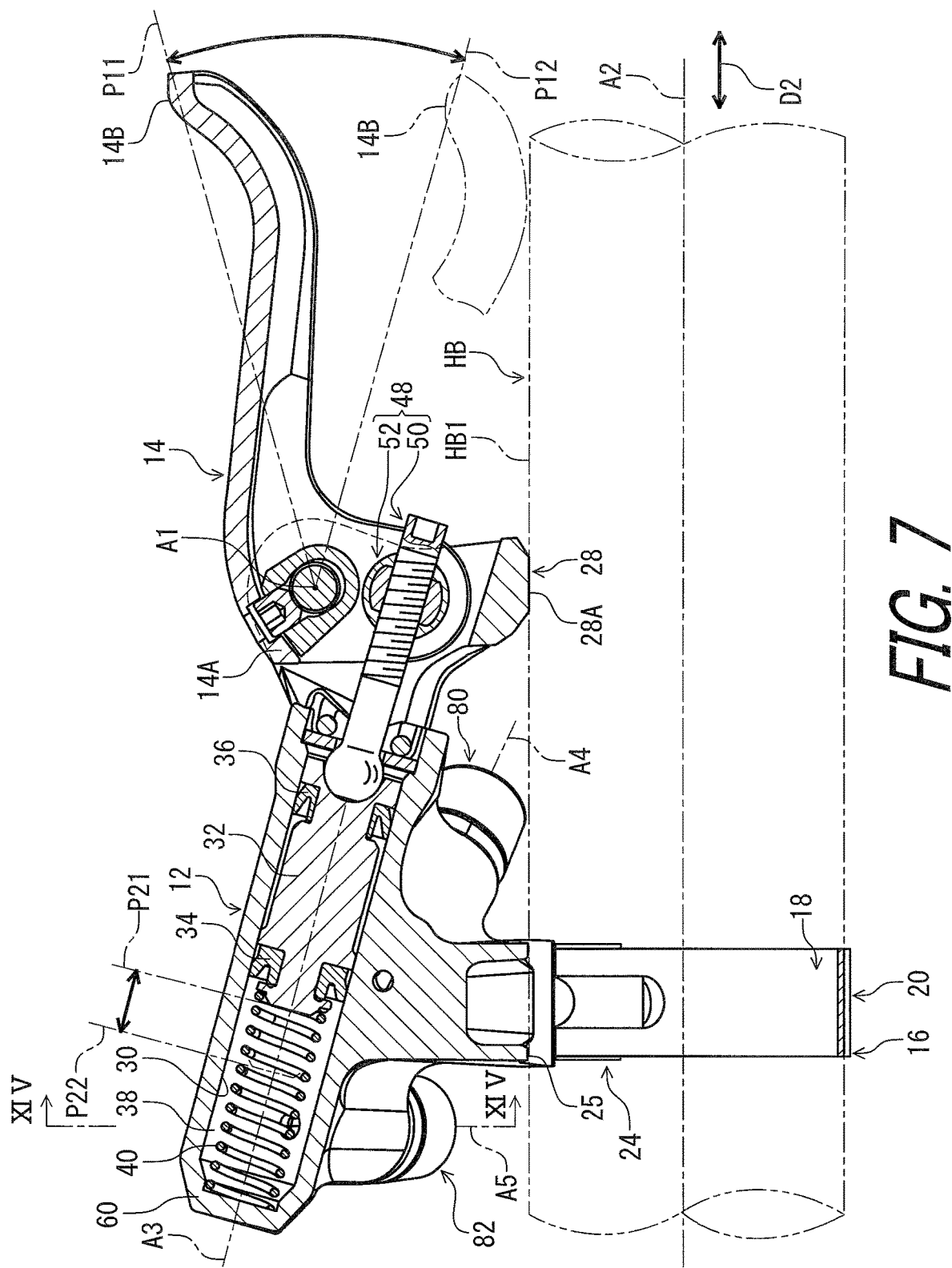
FIG. 7 is a cross-sectional view of the hydraulic operating device taken along line VII-VII of FIG. 6.

As seen in FIG. 7, the base member 12 includes a support portion 28. The support portion 28 is configured to contact the outer circumferential surface of the handlebar HB without clamping the handlebar HB in the mounting state where the handlebar HB extends through the mount opening 18 of the mounting member 16. The support portion 28 is provided between the mounting member 16 and the distal end portion 14B of the operating member 14 in a mount axis direction D2 parallel to the mount center axis A2. The support portion 28 is spaced apart from the mounting member 16 in the mount axis direction D2 as viewed along the pivot axis A1. However, the location of the support portion 28 is not limited to this embodiment. The support portion 28 can be omitted from the base member 12.

Figure 8:
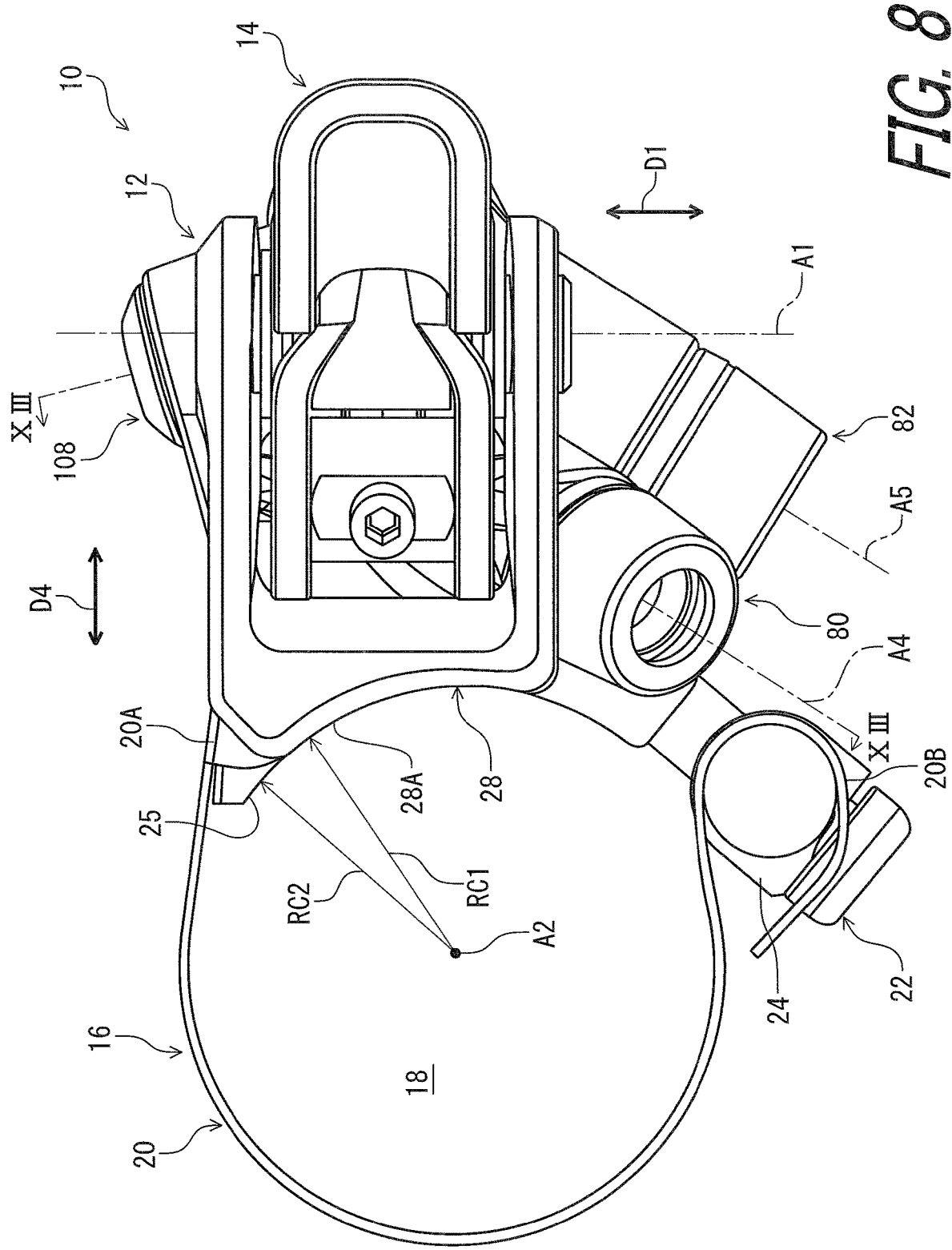
FIG. 8 is a side elevational view of the hydraulic operating device of the human-powered vehicle illustrated in FIG. 1.

As seen in FIG. 8, the support portion 28 includes a support contact surface 28A. The support contact surface 28A has a curved shape extending along the outer circumferential surface of the handlebar HB. The support contact surface 28A has a radius of curvature RC1 equal to a radius of curvature RC2 of the mounting contact surface 25. However, the radius of curvature RC1 of the support contact surface 28A can be different from the radius of curvature RC2 of the mounting contact surface 25. Further, the support contact surface 28A can be offset form the mounting contact surface 25 in the radial direction of the mount opening 18 as viewed along the mount center axis A2

As seen in FIG. 7, the operating member 14 is pivotable relative to the base member 12 about the pivot axis A1 from a rest position P11 to an operated position P12. The support portion 28 is provided between the mounting member 16 and the distal end portion 14B of the operating member 14 in the mount axis direction D2 in a rest state where the operating member 14 is in the rest position P11. The support portion 28 is provided between the mounting member 16 and the distal end portion 14B of the operating member 14 in the mount axis direction D2 in an operated state where the operating member 14 is in the operated position P12.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of the hydraulic operated device 4.

Figure 9:
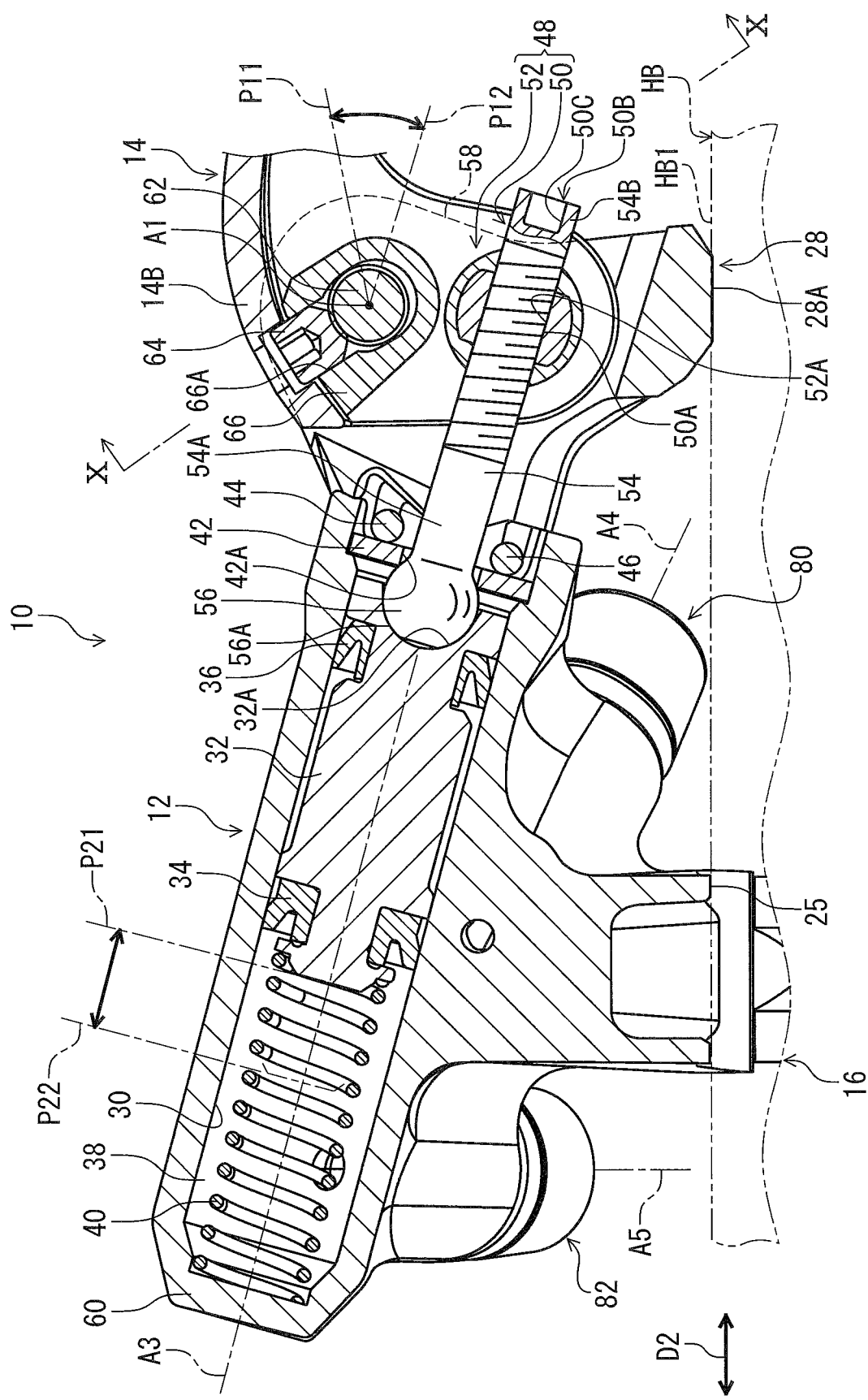
FIG. 9 is a partial enlarged cross-sectional view of the hydraulic operating device illustrated in FIG. 7.

As seen in FIG. 9, the base member 12 includes a cylinder bore 30. The cylinder bore 30 has a cylinder center axis A3. The cylinder bore 30 extends along the cylinder center axis A3. The hydraulic operating device 10 comprises a piston 32. The piston 32 is movably provided in the cylinder bore 30 and is operatively coupled to the operating member 14 to move relative to the base member 12 in response to a pivotal movement of the operating member 14.

The piston 32 is movable relative to the base member 12 between an initial position P21 and an actuated position P22. The piston 32 is in the initial position P21 in the rest state where the operating member 14 is in the rest position P11. The piston 32 is in the actuated position P22 in the operated state where the operating member 14 is in the operated position P12.

The hydraulic operating device 10 comprises a first seal member 34 and a second seal member 36. The first seal member 34 and the second seal member 36 are attached to the piston 32. The piston 32, the first seal member 34, and the cylinder bore 30 define a hydraulic chamber 38. The piston 32, the first seal member 34, the second seal member 36 and the cylinder bore 30 define an additional hydraulic chamber 39.

The hydraulic operating device 10 comprises a piston biasing member 40, a lid 42, a first stopper 44, and a second stopper 46. The piston biasing member 40 is provided in the hydraulic chamber 38 to bias the piston 32 toward the initial position P21. The lid 42 is attached to the base member 12. The first stopper 44 is provided as a pin. The second stopper 46 is provided as a pin. The first stopper 44 and the second stopper 46 are secured to the base member 12. The first stopper 44 and the second stopper 46 position the lid 42 on the base member 12.

In this embodiment, the hydraulic operating device 10 further comprises an adjustment structure 48 configured to adjust the rest position P11 of the operating member 14 with respect to the base member 12. The adjustment structure 48 operatively couples the operating member 14 to the piston 32. The adjustment structure 48 includes a piston rod 50 and a coupling member 52. The piston rod 50 is rotatably and pivotally coupled to the piston 32. The piston rod 50 extends through an opening 42A of the lid 42.

The piston 32 includes a recess 32A. The piston rod 50 includes a rod body 54 and a joint 56. The rod body 54 includes a first rod end 54A and a second rod end 54B opposite to the first rod end 54A. The joint 56 is provided at the first rod end 54A and has a spherical surface 56A. The joint 56 is provided in the recess 32A of the piston 32.

The joint 56 is in contact with the lid 42 in an initial state where the piston 32 is in the initial position P21. A biasing force of the piston biasing member 40 keeps the piston 32 in the initial position P21 in the rest state of the operating member 14.

The coupling member 52 is rotatably coupled to the operating member 14. The coupling member 52 includes a threaded hole 52A. The piston rod 50 includes an externally threaded portion 50A provided on the rod body 54. The externally threaded portion 50A is threadedly engaged with the threaded hole 52A. The piston rod 50 includes a tool engagement part 50B provided at the second rod end 54B. For example, the tool engagement part includes a hexagonal hole 50C. Rotation of the piston rod 50 relative to the coupling member 52 changes a distance between the piston 32 and the coupling member 52, changing the rest position P11 of the operating member 14.

The base member 12 includes a first end portion 58 and a second end portion 60. The second end portion 60 is opposite to the first end portion 58. The operating member 14 is pivotally coupled to the base member 12 at the first end portion 58 about the pivot axis A1. The cylinder bore 30 is provided at least partly between the first end portion 58 and the second end portion 60. In this embodiment, the cylinder bore 30 is entirely provided between the first end portion 58 and the second end portion 60. However, the cylinder bore 30 can be partly provided between the first end portion 58 and the second end portion 60.

The hydraulic operating device 10 comprises a pivot pin 62, a lock screw 64, and a screw holder 66. The pivot pin 62 is attached to the base member 12 to pivotally couple the operating member 14 to the base member 12. The pivot pin 62 defines the pivot axis A1. The lock screw 64 is attached to the screw holder 66 to position the pivot pin 62 on the base member 12. The screw holder 66 includes a lock threaded hole 66A. The lock screw 64 is threadedly engaged in the lock threaded hole 66A.

Figure 10:
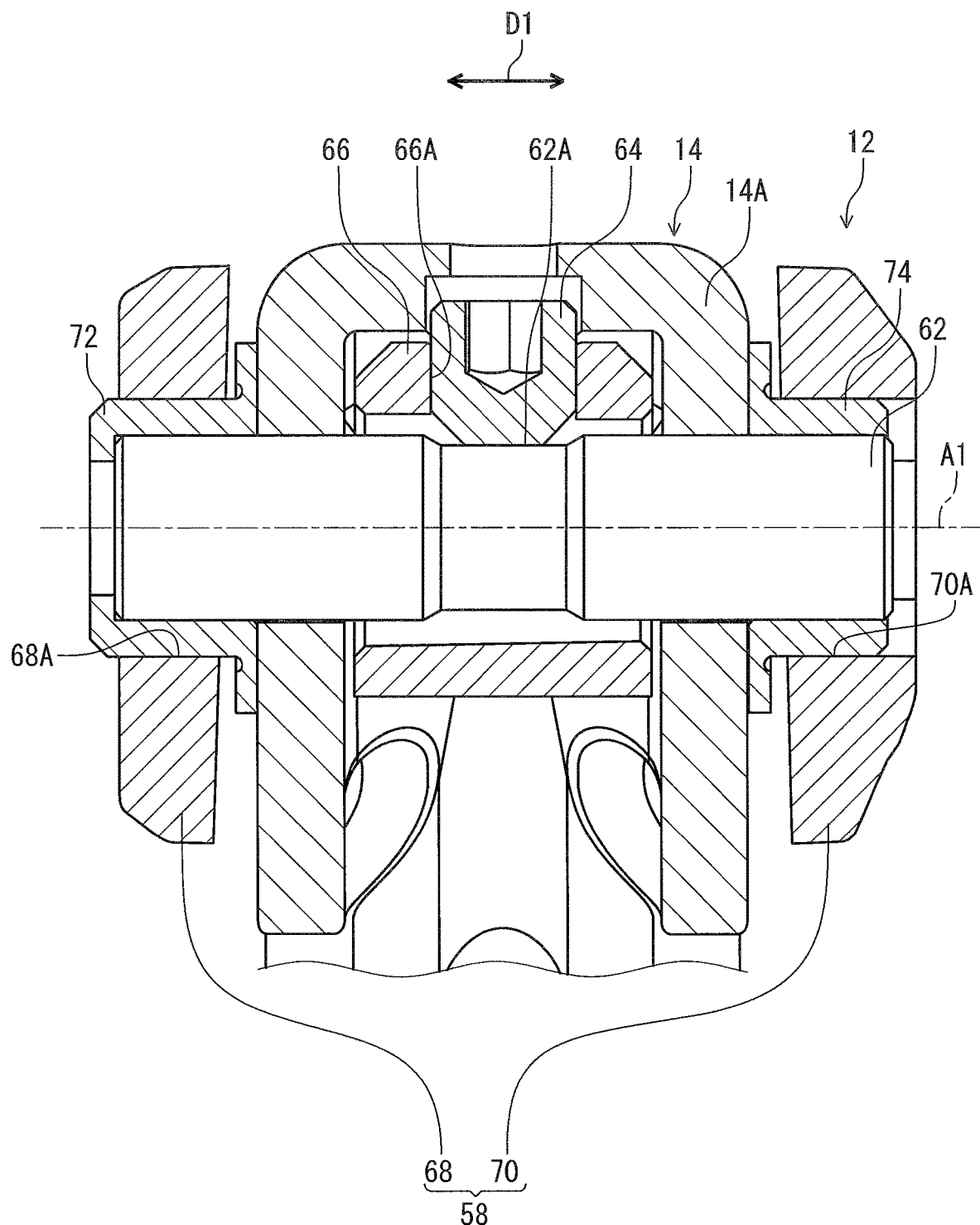
FIG. 10 is a cross-sectional view of the hydraulic operating device taken along line X-X of FIG. 9.

As seen in FIG. 10, the pivot pin 62 includes an annular groove 62A. The lock screw 64 is partly provided in the annular groove 62A extending about the pivot axis A1. The base member 12 includes a first support 68 and a second support 70. The second support 70 is spaced apart from the first support 68 in the pivot axis direction D1 parallel to the pivot axis A1. The first support 68 and the second support 70 constitute the first end portion 58 of the base member 12. The proximal end portion 14A of the operating member 14 is provided between the first support 68 and the second support 70 in the pivot axis direction D1.

The first support 68 includes a first pivot hole 68A. The second support 70 includes a second pivot hole 70A. The pivot pin 62 extends through the first pivot hole 68A and the second pivot hole 70A. The hydraulic operating device 10 comprises a first bushing 72 and a second bushing 74. The first bushing 72 is provided in the first pivot hole 68A. The second bushing 74 is provided in the second pivot hole 70A. The first bushing 72 is provided in the first pivot hole 68A. The second bushing 74 is provided in the second pivot hole 70A. The first bushing 72 is provided between the pivot pin 62 and the first support 68. The second bushing 74 is provided between the pivot pin 62 and the second support 70.

Figure 11:
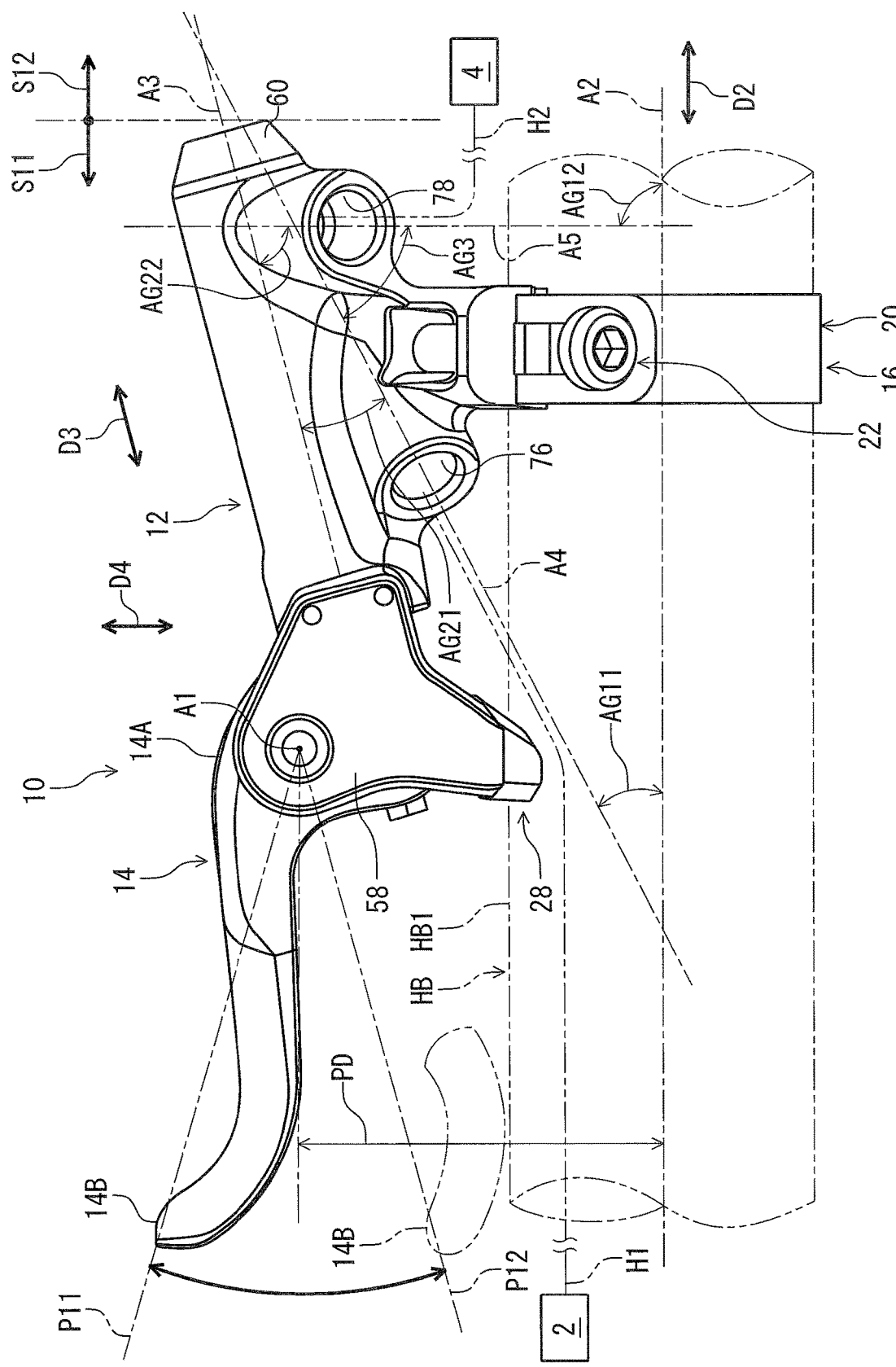
FIG. 11 is a bottom view of the hydraulic operating device of the human-powered vehicle illustrated in FIG. 1, with a first hose connector and a second hose connector omitted.

As seen in FIG. 11, the base member 12 includes a first hose-attachment hole 76 and a second hose-attachment hole 78. The first hose-attachment hole 76 is configured to be in fluid communication with the cylinder bore 30 (FIG. 9). The second hose-attachment hole 78 is configured to be in fluid communication with the cylinder bore 30 (FIG. 9). In this embodiment, the first hose-attachment hole 76 is configured to be connected to the additional hydraulic operating device 2. The second hose-attachment hole 78 is configured to be connected to the hydraulic operated device 4. However, the first hose-attachment hole 76 can be configured to be connected to another hydraulic device such as the hydraulic operated device 4. The second hose-attachment hole 78 can be configured to be connected to another hydraulic device such as the additional hydraulic operating device 2.

Figure 12:
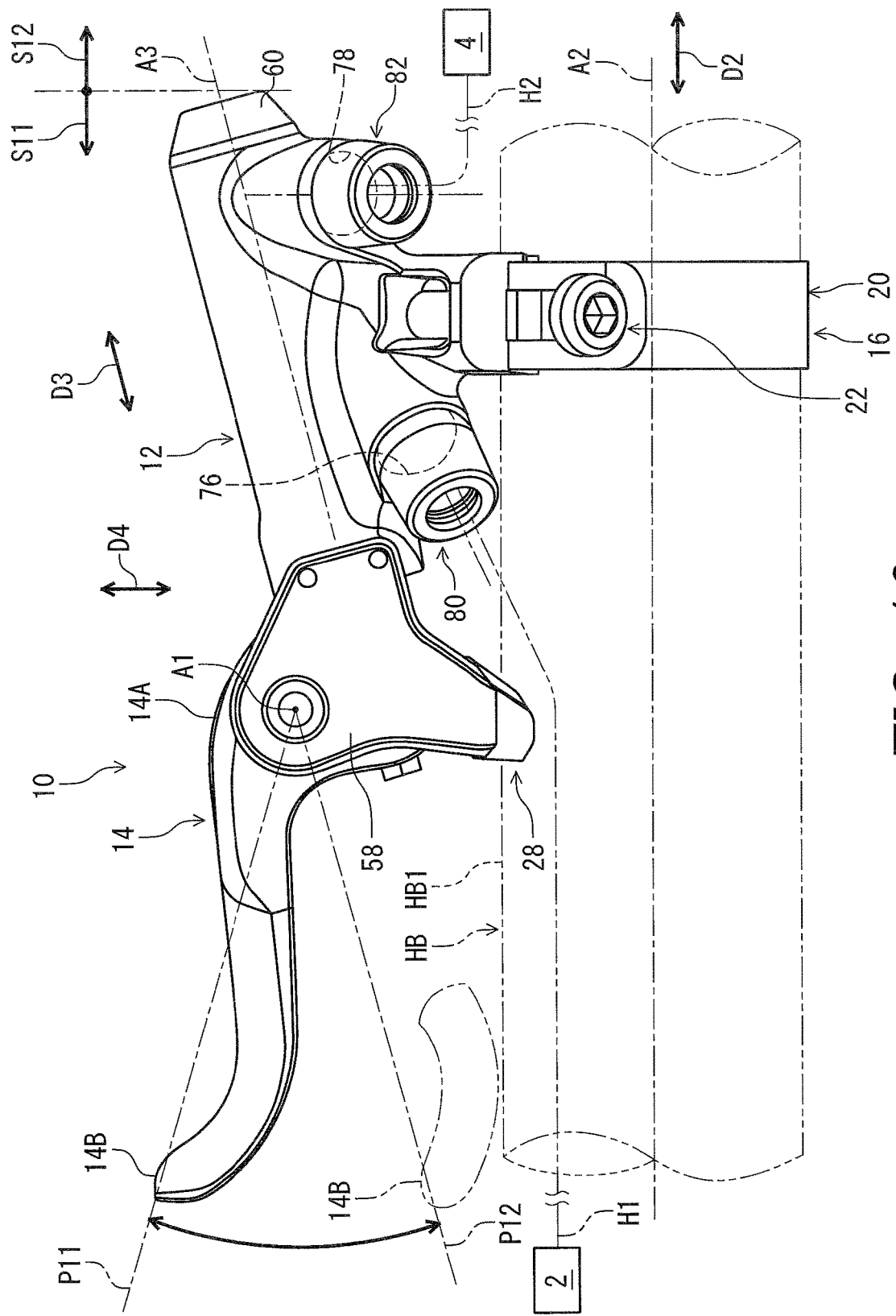
FIG. 12 is a bottom view of the hydraulic operating device of the human-powered vehicle illustrated in FIG. 1.

As seen in FIG. 12, the hydraulic operating device 10 further comprises a first hose connector 80 and a second hose connector 82. The first hose connector 80 is configured to connect the first hydraulic hose H1 to the first hose-attachment hole 76. The second hose connector 82 is configured to connect the second hydraulic hose H2 to the second hose-attachment hole 78.

Figure 13:
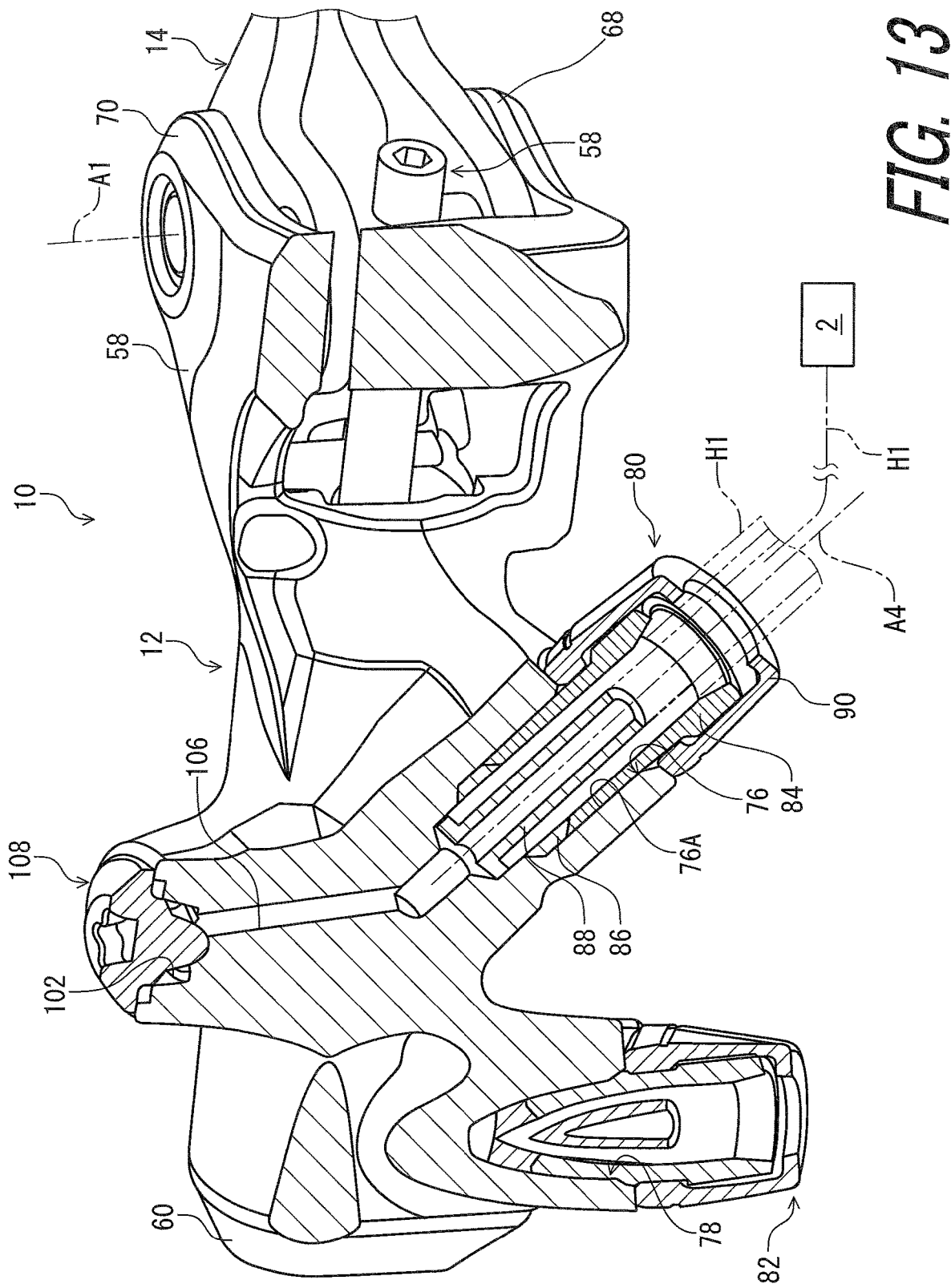
FIG. 13 is a cross-sectional view of the hydraulic operating device taken along line XIII-XIII of FIG. 8.

As seen in FIG. 13, the first hose-attachment hole 76 includes a first threaded hole 76A. The first hose connector 80 includes a first threaded fastening sleeve 84 threadedly engaged with the first threaded hole 76A. The first hose connector 80 includes a first tubular bushing 86 through which the first hydraulic hose H1 is to pass in the first hose-attachment hole 76. The first tubular bushing 86 is configured to be deformed during installation of the first threaded fastening sleeve 84 to the first threaded hole 76A. The first hose connector 80 includes a first insertion 88 and a first cover 90. The first insertion 88 is configured to be provided in an end of the first hydraulic hose H1. In accordance with a deformation of the first tubular bushing 86, the first tubular bushing 86 catches the end of the first hydraulic hose H1 to position the end of the first hydraulic hose H1 with respect to the base member 12. The first cover 90 is attached to the first threaded fastening sleeve 84 to at least partly cover (in this embodiment, entirely cover) the first threaded fastening sleeve 84. However, the first hose connector 80 can include a banjo and a banjo bolt while the first hose connector 80 is a straight-type connector.

Figure 14:
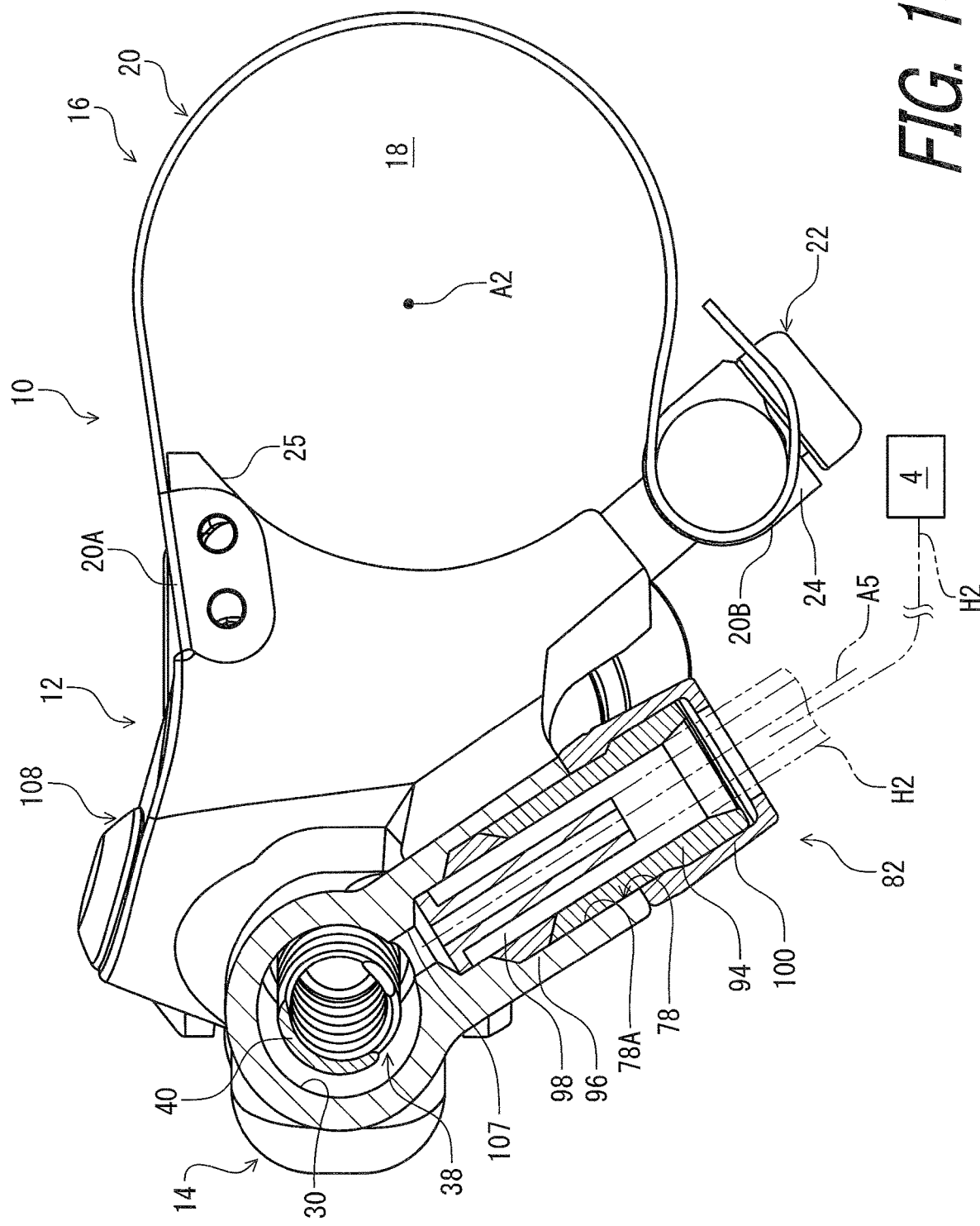
FIG. 14 is a cross-sectional view of the hydraulic operating device taken along line XIV-XIV of FIG. 7.

As seen in FIG. 14, the second hose-attachment hole 78 includes a second threaded hole 78A. The second hose connector 82 includes a second threaded fastening sleeve 94 threadedly engaged with the second threaded hole 78A. The second hose connector 82 includes a second tubular bushing 96 through which the second hydraulic hose H2 is to pass in the second hose-attachment hole 78. The second tubular bushing 96 is configured to be deformed during installation of the second threaded fastening sleeve 94 to the second threaded hole 78A. The second hose connector 82 includes a second insertion 98 and a second cover 100. The second insertion 98 is configured to be provided in an end of the second hydraulic hose H2. In accordance with a deformation of the second tubular bushing 96, the second tubular bushing 96 catches the end of the second hydraulic hose H2 to position the end of the second hydraulic hose H2 with respect to the base member 12. The second cover 100 is attached to the second threaded fastening sleeve 94 to at least partly cover (in this embodiment, entirely cover) the second threaded fastening sleeve 94. However, the second hose connector 82 can include a banjo and a banjo bolt while the second hose connector 82 is a straight-type connector.

As seen in FIG. 11, the first hose-attachment hole 76 has a first center axis A4. The second hose-attachment hole 78 has a second center axis A5. The first hose-attachment hole 76 faces in a direction parallel to the first center axis A4. The second hose-attachment hole 78 faces in a direction parallel to the second center axis A5. The first center axis A4 is non-parallel to the second center axis A5 as viewed along the pivot axis A1. The first center axis A4 is non-perpendicular to the second center axis A5 as viewed along the pivot axis A1. However, the first center axis A4 can be parallel to the second center axis A5 as viewed along the pivot axis A1. The first center axis A4 can be perpendicular to the second center axis A5 as viewed along the pivot axis A1.

The first center axis A4 is non-parallel to the mount center axis A2. The second center axis A5 is non-parallel to the mount center axis A2. The first center axis A4 is non-parallel to a cylinder axis direction D3 parallel to the cylinder center axis A3. The second center axis A5 is non-parallel to the cylinder axis direction D3. The first center axis A4 is non-perpendicular to the cylinder axis direction D3. The second center axis A5 is non-perpendicular to the cylinder axis direction D3.

However, the first center axis A4 can be parallel to the mount center axis A2. The second center axis A5 can be parallel to the mount center axis A2. The first center axis A4 can be parallel to a cylinder axis direction D3 parallel to the cylinder center axis A3. The second center axis A5 can be parallel to the cylinder axis direction D3. The first center axis A4 can be perpendicular to the cylinder axis direction D3. The second center axis A5 can be perpendicular to the cylinder axis direction D3.

The cylinder center axis A3 is non-perpendicular to the mount center axis A2 as viewed along the pivot axis A1. The cylinder center axis A3 is non-parallel to the mount center axis A2 as viewed along the pivot axis A1. However, the cylinder center axis A3 can be perpendicular to the mount center axis A2 as viewed along the pivot axis A1. The cylinder center axis A3 can be parallel to the mount center axis A2 as viewed along the pivot axis A1.

At least one of the first hose-attachment hole 76 and the second hose-attachment hole 78 faces toward the mount center axis A2 of the mount opening 18 as viewed along the pivot axis A1. In this embodiment, both the first hose-attachment hole 76 and the second hose-attachment hole 78 faces toward the mount center axis A2 of the mount opening 18 as viewed along the pivot axis A1. However, only one of the first hose-attachment hole 76 and the second hose-attachment hole 78 can face toward the mount center axis A2 of the mount opening 18 as viewed along the pivot axis A1. In such embodiments, the other of the first hose-attachment hole 76 and the second hose-attachment hole 78 faces in the mount axis direction D2 as viewed along the pivot axis A1 or toward an opposite side of the mount center axis A2 of the mount opening 18 as viewed along the pivot axis A1.

The first hose-attachment hole 76 is provided between the mounting member 16 and the support portion 28 in the mount axis direction D2 as viewed along the pivot axis A1. The mounting member 16 and first hose-attachment hole 76 are provided between the second hose-attachment hole 78 and the support portion 28 in the mount axis direction D2 as viewed along the pivot axis A1. The support portion 28 is closer to the mount center axis A2 than the first hose-attachment hole 76 and the second hose-attachment hole 78 as viewed along the pivot axis A1. The first hose-attachment hole 76 faces toward the support portion 28 as viewed along the pivot axis A1.

However, the positional relationship among the first hose-attachment hole 76, the second hose-attachment hole 78, the mounting member 16, the support portion 28, and the mount center axis A2 is not limited to this embodiment. The first hose-attachment hole 76 can be provided at a position other than between the mounting member 16 and the support portion 28 in the mount axis direction D2 as viewed along the pivot axis A1. The mounting member 16 and first hose-attachment hole 76 can be provided at a position other than between the second hose-attachment hole 78 and the support portion 28 in the mount axis direction D2 as viewed along the pivot axis A1. The support portion 28 can be farther from the mount center axis A2 than the first hose-attachment hole 76 and the second hose-attachment hole 78 as viewed along the pivot axis A1. The first hose-attachment hole 76 can face in another direction when viewed along the pivot axis A1.

The mounting member 16 is provided between the first hose-attachment hole 76 and the second hose-attachment hole 78 in the mount axis direction D2 parallel to the mount center axis A2 as viewed along the pivot axis A1. The first hose-attachment hole 76 is provided between the mount opening 18 and the second hose-attachment hole 78 in a perpendicular direction D4 perpendicular to both the pivot axis A1 and the mount center axis A2 as viewed along the pivot axis A1.

However, the mounting member 16 can be provided at a position other than between the first hose-attachment hole 76 and the second hose-attachment hole 78 in the mount axis direction D2 parallel to the mount center axis A2 as viewed along the pivot axis A1. The first hose-attachment hole 76 can be provided at a position other than between the mount opening 18 and the second hose-attachment hole 78 in a perpendicular direction D4 perpendicular to both the pivot axis A1 and the mount center axis A2 as viewed along the pivot axis A1.

The first hose-attachment hole 76 and the second hose-attachment hole 78 are provided closer to the pivot axis A1 than the second end portion 60 of the base member 12. The pivot axis A1, the first hose-attachment hole 76, and the second hose-attachment hole 78 are provided on a first side S11 of the second end portion 60 in the mount axis direction D2 parallel to the mount center axis A2 when viewed along the pivot axis A1. No portion of the hydraulic operating device 10 is provided on a second side S12 of the second end portion 60 in the mount axis direction D2 when viewed along the pivot axis A1. The second side S12 is provided on an opposite side of the first side S11 relative to the second end portion 60 in the mount axis direction D2.

However, the first hose-attachment hole 76 and the second hose-attachment hole 78 can be provided farther from the pivot axis A1 than the second end portion 60 of the base member 12. At least one of the pivot axis A1, the first hose-attachment hole 76, and the second hose-attachment hole 78 can be provided on the second side S12 of the second end portion 60 in the mount axis direction D2 parallel to the mount center axis A2 when viewed along the pivot axis A1.

The first hose-attachment hole 76 is provided between the pivot axis A1 and the second end portion 60 in the mount axis direction D2 as viewed along the pivot axis A1. The second hose-attachment hole 78 is provided between the pivot axis A1 and the second end portion 60 in the mount axis direction D2 as viewed along the pivot axis A1. The second hose-attachment hole 78 is provided between the second end portion 60 and the first hose-attachment hole 76 in the mount axis direction D2 as viewed along the pivot axis A1. The first hose-attachment hole 76 is provided between the pivot axis A1 and the second hose-attachment hole 78 in the mount axis direction D2 parallel to the mount center axis A2.

However, at least one of the first hose-attachment hole 76 and the second hose-attachment hole 78 can be provided at a position other than between the pivot axis A1 and the second end portion 60 in the mount axis direction D2 as viewed along the pivot axis A1. The second hose-attachment hole 78 can be provided at a position other than between the second end portion 60 and the first hose-attachment hole 76 in the mount axis direction D2 as viewed along the pivot axis A1. The first hose-attachment hole 76 can be provided at a position other than between the pivot axis A1 and the second hose-attachment hole 78 in the mount axis direction D2.

The first hose-attachment hole 76 and the second hose-attachment hole 78 are closer to the mount center axis A2 than the pivot axis A1 in the perpendicular direction D4 perpendicular to both the pivot axis A1 and the mount center axis A2. The first hose-attachment hole 76 and the second hose-attachment hole 78 are provided between the pivot axis A1 and the mount center axis A2 in the perpendicular direction D4 perpendicular to both the pivot axis A1 and the mount center axis A2.

However, the first hose-attachment hole 76 and the second hose-attachment hole 78 can be farther from the mount center axis A2 than the pivot axis A1 in the perpendicular direction D4. The first hose-attachment hole 76 and the second hose-attachment hole 78 can be provided at a position other than between the pivot axis A1 and the mount center axis A2 in the perpendicular direction D4.

As seen in FIG. 11. a first hole angle AG11 is defined between the mount center axis A2 and the first center axis A4 as viewed along the pivot axis A1. A second hole angle AG12 is defined between the mount center axis A2 and the second center axis A5 as viewed along the pivot axis A1. The first hole angle AG11 is different from the second hole angle AG12. The first hole angle AG11 is smaller than the second hole angle AG12. However, the first hole angle AG11 can be equal to or larger than the second hole angle AG12.

A first angle AG21 is defined between the cylinder center axis A3 and the first center axis A4 as viewed along the pivot axis A1. A second angle AG22 is defined between the cylinder center axis A3 and the second center axis A5 as viewed along the pivot axis A1. The first angle AG21 is different from the second angle AG22. The first angle AG21 is smaller than the second angle AG22. However, the first angle AG21 can be equal to or larger than the second angle AG22.

An intermediate angle AG3 is defined between the first center axis A4 and the second center axis A5 as viewed along the pivot axis A1. The intermediate angle AG3 is larger than the first hole angle AG11, the first angle AG21, and the second angle AG22. The intermediate angle AG3 is smaller than the second hole angle AG12. However, the intermediate angle AG3 can be equal to or smaller than at least one of the first hole angle AG11, the first angle AG21, and the second angle AG22. The intermediate angle AG3 can be equal to or larger than the second hole angle AG12.

A pivot-axis distance PD is defined between the pivot axis A1 and the mount center axis A2 as viewed along the pivot axis A1. For example, the pivot-axis distance PD ranges from 30 mm to 50 mm. In this embodiment, the pivot-axis distance PD is approximately 38 mm as the mounting member 16 is coupled to the handlebar HB having a diameter which is 31.8 mm. However, the pivot-axis distance PD is not limited to this embodiment and the above range.

Figure 15:
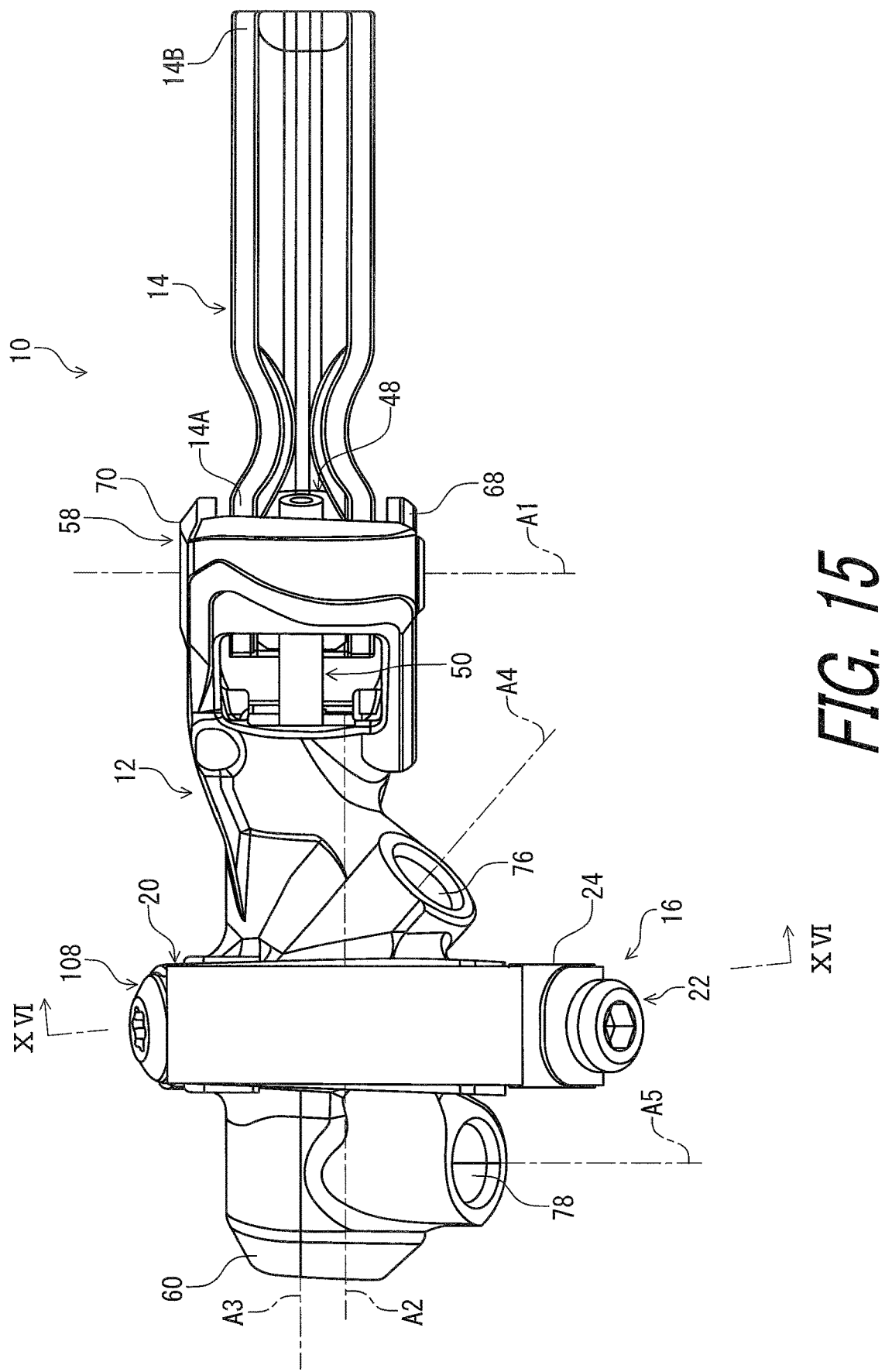
FIG. 15 is a rear view of the hydraulic operating device of the human-powered vehicle illustrated in FIG. 1, with the first hose connector and the second hose connector omitted.

As seen in FIG. 15, the first center axis A4 and the second center axis A5 are non-perpendicular to the pivot axis A1 as viewed in the perpendicular direction D4 perpendicular to both the pivot axis A1 and the mount center axis A2. At least one of the first center axis A4 and the second center axis A5 is parallel to the pivot axis A1 as viewed in the perpendicular direction D4. In this embodiment, the second center axis A5 is parallel to the pivot axis A1 as viewed in the perpendicular direction D4 while the first center axis A4 is non-parallel to the pivot axis A1 as viewed in the perpendicular direction D4. However, the second center axis A5 can be parallel to the pivot axis A1 as viewed in the perpendicular direction D4. The first center axis A4 can be non-parallel to the pivot axis A1 as viewed in the perpendicular direction D4.

The first center axis A4 defines a first orientation with respect to the pivot axis A1 as viewed in the perpendicular direction D4. The second center axis A5 defines a second orientation with respect to the pivot axis A1 as viewed in the perpendicular direction D4. In this embodiment, the first orientation is different from the second orientation. However, the first orientation can be identical to the second orientation with respect to the pivot axis A1 as viewed in the perpendicular direction D4.

Figure 16:
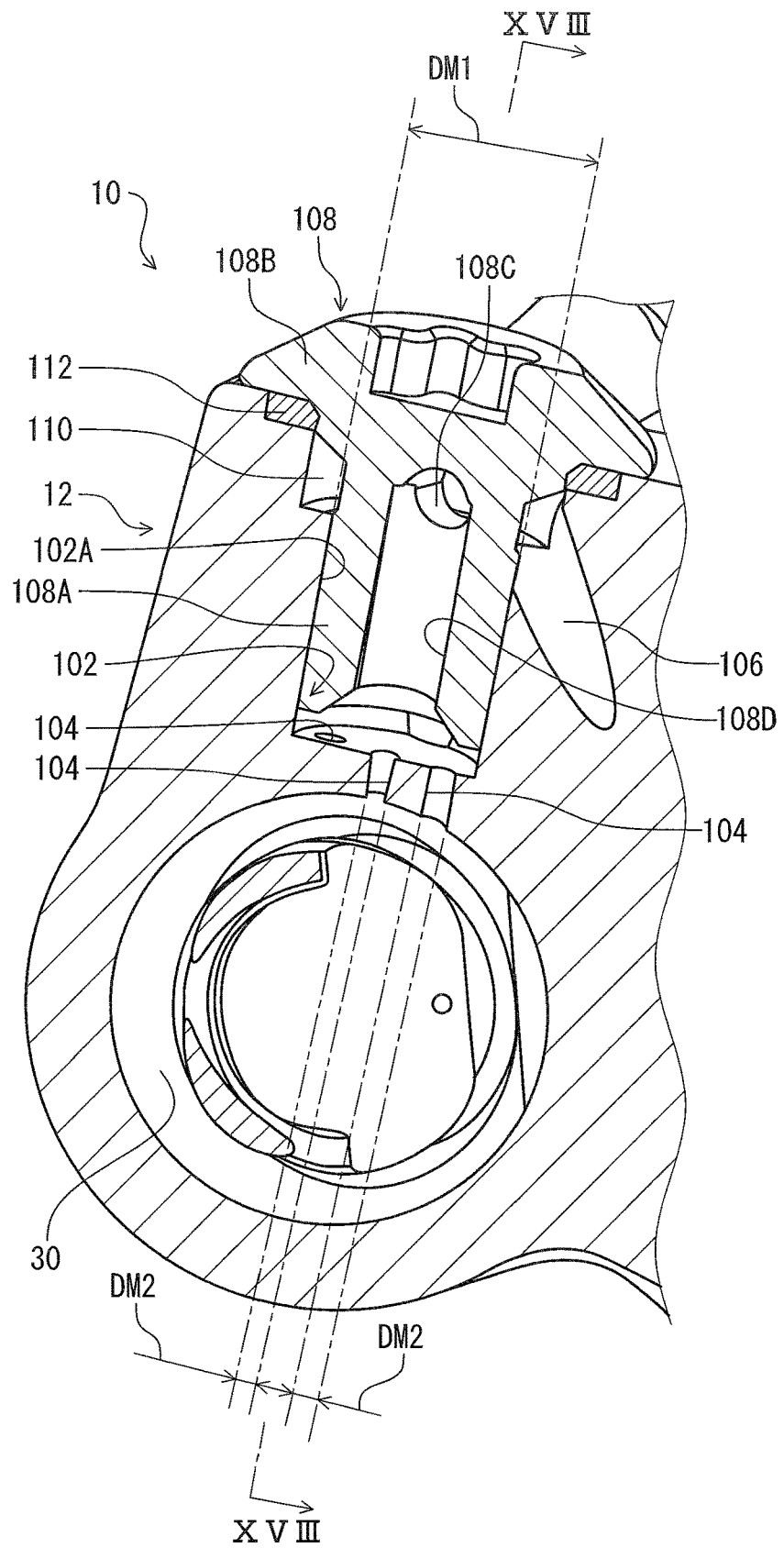
FIG. 16 is a cross-sectional view of the hydraulic operating device taken along line XVI-XVI of FIG. 15.

As seen in FIG. 16, the base member 12 includes an additional hole 102 configured to be in fluid communication with the cylinder bore 30. The additional hole 102 is provided between the first hose-attachment hole 76 and the second hose-attachment hole 78 in the mount axis direction D2 parallel to the mount center axis A2 as viewed along the pivot axis A1. The base member 12 includes a connecting hole 104 connecting the additional hole 102 to the cylinder bore 30. In this embodiment, the base member 12 includes a plurality of connecting holes 104. However, a total number of the connecting holes 104 is not limited to this embodiment. The additional hole 102 has a first diameter DM1. The connecting hole 104 has a second diameter DM2 smaller than the first diameter DM1. However, the second diameter DM2 can be equal to or larger than the first diameter DM1.

Figure 17:
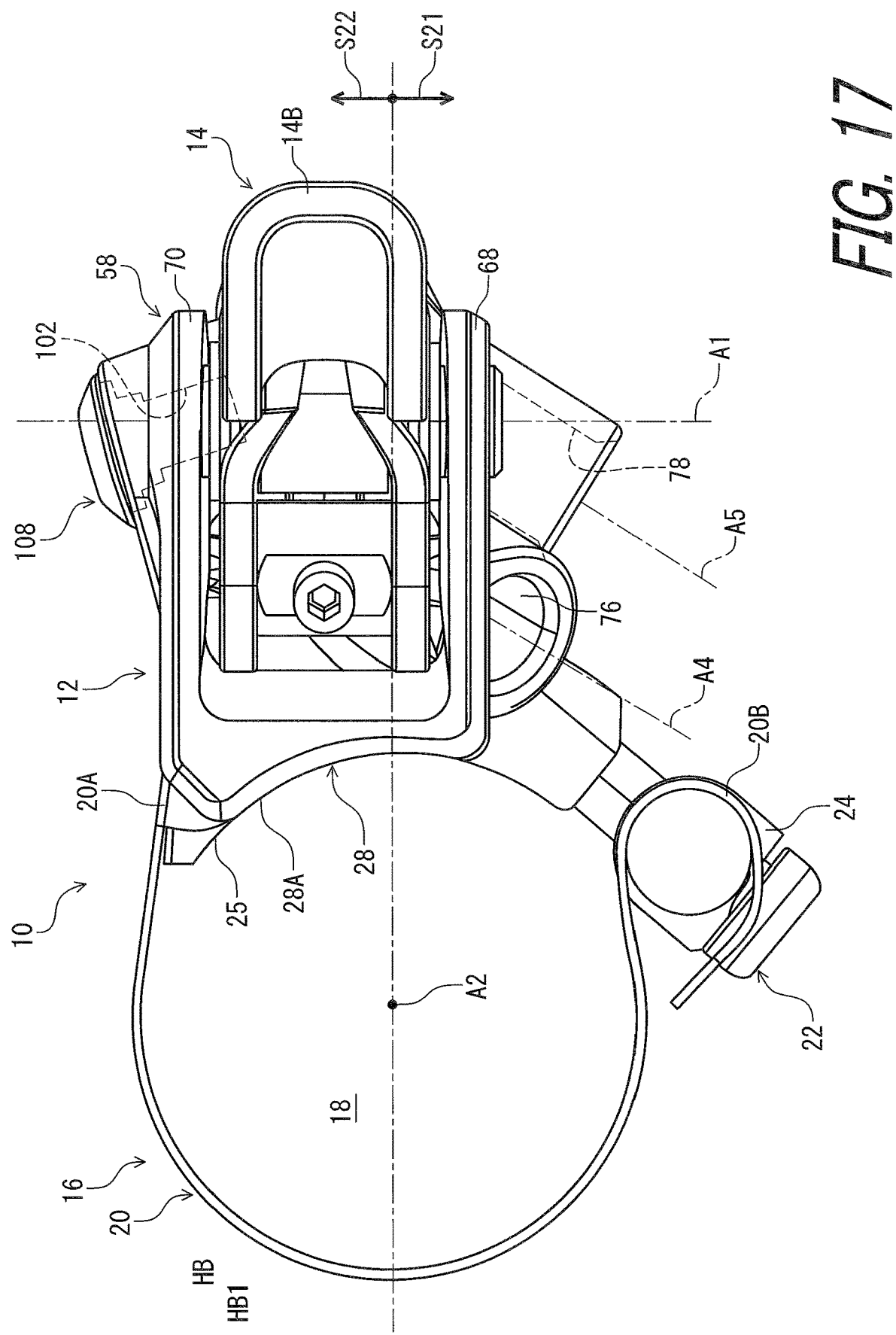
FIG. 17 is a side elevational view of the hydraulic operating device of the human-powered vehicle illustrated in FIG. 1, with the first hose connector and the second hose connector omitted.

As seen in FIG. 17, the first hose-attachment hole 76 and the second hose-attachment hole 78 are provided on a first axial side S21 of the mount center axis A2 in the pivot axis direction D1 parallel to the pivot axis A1 as viewed in the mount axis direction D2. The additional hole 102 is provided on a second axial side S22 of the mount center axis A2 in the pivot axis direction D1 as viewed in the mount axis direction D2. The second axial side S22 is provided on an opposite side of the first axial side S21 relative to the mount center axis A2 in the pivot axis direction D1.

However, at least one of the first hose-attachment hole 76 and the second hose-attachment hole 78 can be provided on the second axial side S22 of the mount center axis A2 in the pivot axis direction D1 as viewed in the mount axis direction D2. The additional hole 102 can be provided on the same side of the mount center axis A2 as the first hose-attachment hole 76 and the second hose-attachment hole 78 in the pivot axis direction D1 as viewed in the mount axis direction D2.

As seen in FIG. 13, the additional hole 102 is provided between the first hose-attachment hole 76 and the cylinder bore 30 so as to fluidly connect the first hose-attachment hole 76 to the cylinder bore 30. In this embodiment, the base member 12 includes a first intermediate hole 106 connecting the first hose-attachment hole 76 to the cylinder bore 30. Thus, the hydraulic chamber 38 (FIG. 9) of the hydraulic operating device 10 is in fluid communication with a master chamber of the additional hydraulic operating device 2.

As seen in FIG. 14, the base member 12 includes a second intermediate hole 107 connecting the second hose-attachment hole 78 to the cylinder bore 30. Thus, the hydraulic chamber 38 of the hydraulic operating device 10 is in fluid communication with a slave chamber of the hydraulic operated device 4.

As seen in FIG. 16, the hydraulic operating device 10 further comprises a plug 108 threadedly engaged with the additional hole 102. The plug 108 includes a tubular part 108A and a head part 108B provided at an end of the tubular part 108A. The additional hole 102 includes an additional threaded hole 102A. The tubular part 108A is threadedly engaged with the additional threaded hole 102A. The tubular part 108A includes a first hole 108C and a second hole 108D connected to the first hole 108C. The base member 12 includes an annular recess 110 connected to the first intermediate hole 106. The first hose-attachment hole 76 is connected to the cylinder bore 30 with the first intermediate hole 106, the annular recess 110, the first hole 108C, the second hole 108D, the additional hole 102, and the connecting holes 104. The hydraulic operating device 10 comprises a seal ring 112 provided between the plug 108 and the base member 12. The additional hole 102 can be used as a bleeding port.

Figure 18:
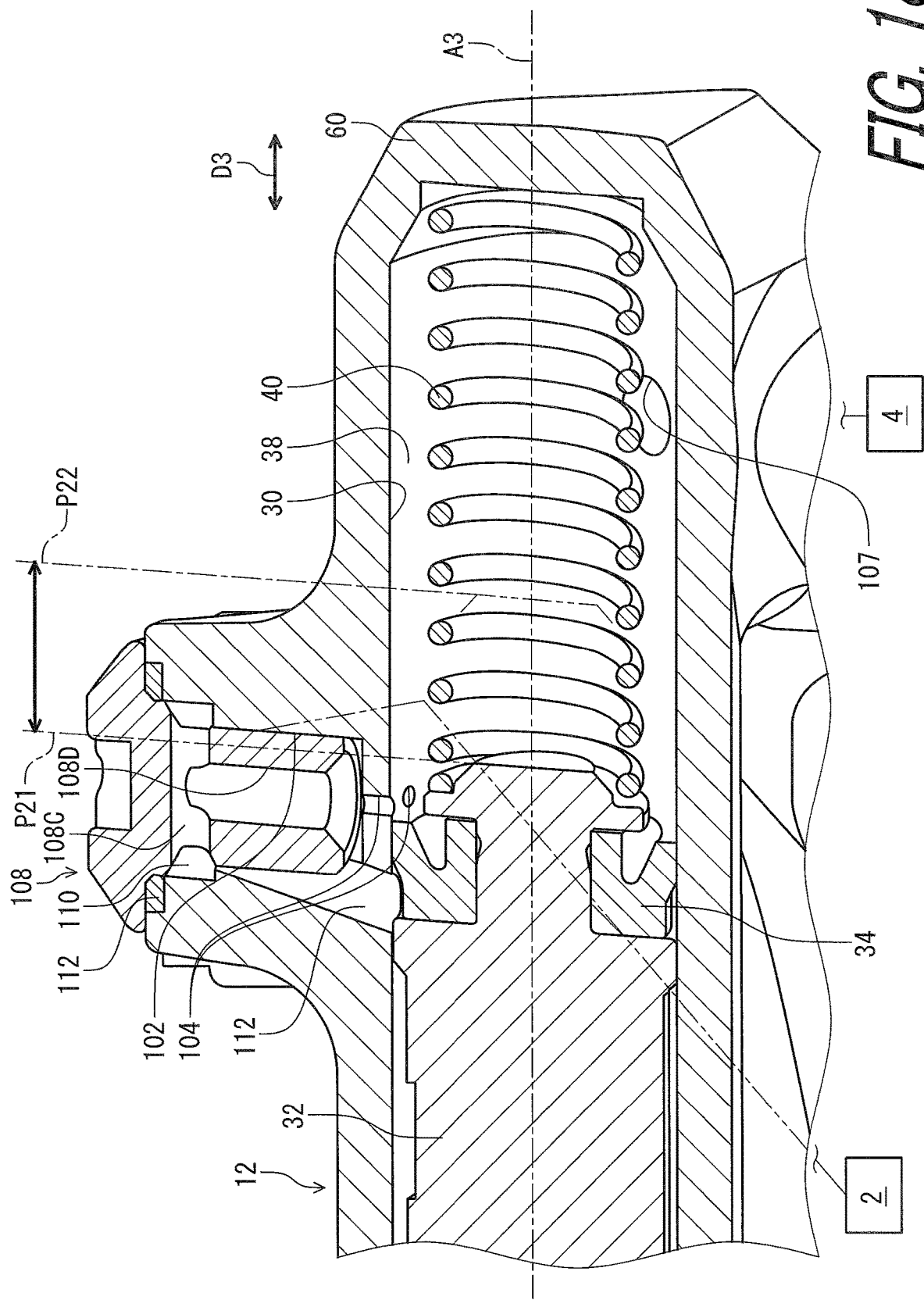
FIG. 18 is a cross-sectional view of the hydraulic operating device taken along line XVIII-XVIII of FIG. 16.

As seen in FIG. 18, the base member 12 includes an additional connecting hole 114 connecting the additional hole 102 to the cylinder bore 30. The additional connecting hole 114 is provided on an opposite side of the connecting holes 104 with respect to the first seal member 34 in the cylinder axis direction D3 in the initial state of the piston. The connecting holes 104 are provided between the first seal member 34 and the second intermediate hole 107 in the cylinder axis direction D3 in the initial state of the piston 32. The connecting holes 104 and the second intermediate hole 107 are in fluid communication with the hydraulic chamber 38 in the initial state of the piston 32. Thus, the hydraulic chamber 38 is in fluid communication with the master chamber 2D (FIG. 2) of the additional hydraulic operating device 2 and the slave chamber 4C (FIG. 3) of the hydraulic operated device 4 in the initial state of the piston 32. In this state, the hydraulic pressure generated by the additional hydraulic operating device 2 is transmitted from the master chamber 2D (FIG. 2) of the additional hydraulic operating device 2 to the slave chamber 4C (FIG. 3) of the hydraulic operated device 4 via the hydraulic chamber 38.

When the first seal member 34 moves from the initial position P21 toward the actuated position P22, the first seal member 34 passes through the connecting holes 104, blocking the fluid communication between the connecting holes 104 and the hydraulic chamber 38. Thus, the hydraulic chamber 38 is in fluid communication with only the slave chamber 4C (FIG. 3) of the hydraulic operated device 4 in a state where the first seal member 34 blocks the fluid communication between the connecting holes 104 and the hydraulic chamber 38. In this state, the hydraulic pressure generated by the hydraulic operating device 10 is transmitted from the hydraulic chamber 38 to the slave chamber 4C (FIG. 3) of the hydraulic operated device 4 without being transmitted to the additional hydraulic operating device 2. Accordingly, the user can operate the hydraulic operated device 4 using the hydraulic operating device 10 or the additional hydraulic operating device 2.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element"

itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic operating device comprising:
   a base member including
      a cylinder bore,
      a first hose-attachment hole configured to be in fluid communication with the cylinder bore, and
      a second hose-attachment hole configured to be in fluid communication with the cylinder bore;
   an operating member including a proximal end portion and a distal end portion opposite to the proximal end portion, the operating member being pivotally coupled to the base member at the proximal end portion about a pivot axis;
   a piston movably provided in the cylinder bore and operatively coupled to the operating member to move relative to the base member in response to a pivotal movement of the operating member; and
   a mounting member configured to couple the base member to a handlebar, the mounting member including a mount opening through which the handlebar is to extend, the mount opening having a mount center axis,
   the base member including a support portion configured to contact an outer circumferential surface of the handlebar without clamping the handlebar in a mounting state where the handlebar extends through the mount opening of the mounting member,
   the support portion is closer to the pivot axis than to the mounting member, and
   the mounting member being provided between the first hose-attachment hole and the second hose-attachment hole in a mount axis direction parallel to the mount center axis as viewed along the pivot axis.

2. The hydraulic operating device according to claim 1, wherein
   the support portion is provided between the mounting member and the distal end portion of the operating member in a mount axis direction parallel to the mount center axis.

3. The hydraulic operating device according to claim 2, wherein
   the support portion is spaced apart from the mounting member in the mount axis direction as viewed along the pivot axis.

4. The hydraulic operating device according to claim 2, wherein
   the first hose-attachment hole is provided between the mounting member and the support portion in the mount axis direction as viewed along the pivot axis.

5. The hydraulic operating device according to claim 2, wherein
   the mounting member and first hose-attachment hole are provided between the second hose-attachment hole and the support portion in the mount axis direction as viewed along the pivot axis.

6. The hydraulic operating device according to claim 1, wherein
   the support portion is closer to the mount center axis than the first hose-attachment hole and the second hose-attachment hole as viewed along the pivot axis.

7. The hydraulic operating device according to claim 1, wherein
   the first hose-attachment hole faces toward the support portion as viewed along the pivot axis.

8. The hydraulic operating device according to claim 1, wherein
   the first hose-attachment hole is configured to be connected to an additional hydraulic operating device, and
   the second hose-attachment hole is configured to be connected to a hydraulic operated device.

9. The hydraulic operating device according to claim 1, further comprising
   a first hose connector configured to connect a first hydraulic hose to the first hose-attachment hole; and
   a second hose connector configured to connect a second hydraulic hose to the second hose-attachment hole.

10. The hydraulic operating device according to claim 9, wherein
    the first hose-attachment hole includes a first threaded hole, and
    the first hose connector includes
       a first threaded fastening sleeve threadedly engaged with the first threaded hole, and
       a first tubular bushing through which the first hydraulic hose is to pass in the first hose-attachment hole, the first tubular bushing being configured to be deformed during installation of the first threaded fastening sleeve to the first threaded hole.

11. The hydraulic operating device according to claim 9, wherein
    the second hose-attachment hole includes a second threaded hole, and
    the second hose connector includes
       a second threaded fastening sleeve threadedly engaged with the second threaded hole, and
       a second tubular bushing through which the second hydraulic hose is to pass in the second hose-attachment hole, the second tubular bushing being configured to be deformed during installation of the second threaded fastening sleeve to the second threaded hole.

12. The hydraulic operating device according to claim 1, further comprising
    an adjustment structure configured to adjust a rest position of the operating member with respect to the base member.

13. A hydraulic operating device comprising:
    a base member including
       a cylinder bore having a cylinder center axis,
       a first hose-attachment hole configured to be in fluid communication with the cylinder bore, the first hose-attachment hole having a first center axis that is not parallel to the cylinder center axis, a second hose-attachment hole configured to be in fluid communication with the cylinder bore, the second hose-attachment hole having a second center axis that is not parallel to the cylinder center axis, and an additional hole configured to be in fluid communication with the cylinder bore;

an operating member pivotally coupled to the base member about a pivot axis;

a piston movably provided in the cylinder bore and operatively coupled to the operating member to move relative to the base member in response to a pivotal movement of the operating member; and a mounting member configured to couple the base member to a handlebar, the mounting member including a mount opening through which the handlebar is to extend, the mount opening having a mount center axis, wherein the additional hole is provided between the first hose-attachment hole and the second hose-attachment hole in a mount axis direction parallel to the mount center axis as viewed along the pivot axis.

14. The hydraulic operating device according to claim 13, wherein the first hose-attachment hole and the second hose-attachment hole are provided on a first axial side of the mount center axis in a pivot axis direction parallel to the pivot axis as viewed in the mount axis direction, and the additional hole is provided on a second axial side of the mount center axis in the pivot axis direction as viewed in the mount axis direction, the second axial side being provided on an opposite side of the first axial side relative to the mount center axis in the pivot axis direction.

15. The hydraulic operating device according to claim 13, wherein the additional hole is provided between the first hose-attachment hole and the cylinder bore so as to fluidly connect the first hose-attachment hole to the cylinder bore.

16. The hydraulic operating device according to claim 13, wherein the base member includes a connecting hole connecting the additional hole to the cylinder bore, the additional hole has a first diameter, and the connecting hole has a second diameter smaller than the first diameter.

17. The hydraulic operating device according to claim 13, further comprising a plug threadedly engaged with the additional hole.

18. The hydraulic operating device according to claim 13, further comprising a mounting member configured to couple the base member to a handlebar, the mounting member including a mount opening through which the handlebar is to extend, the mount opening having a mount center axis, wherein the operating member includes a proximal end portion and a distal end portion opposite to the proximal end portion, the operating member being pivotally coupled to the base member at the proximal end portion about the pivot axis, and the base member includes a support portion provided between the mounting member and the distal end portion of the operating member in a mount axis direction parallel to the mount center axis, the support portion being configured to contact an outer circumferential surface of the handlebar without clamping the handlebar in a mounting state where the handlebar extends through the mount opening of the mounting member.

19. A hydraulic operating device comprising:

a base member including a cylinder bore, a first hose-attachment hole configured to be in fluid communication with the cylinder bore, and a second hose-attachment hole configured to be in fluid communication with the cylinder bore;

an operating member pivotally coupled to the base member about a pivot axis;

a piston movably provided in the cylinder bore and operatively coupled to the operating member to move relative to the base member in response to a pivotal movement of the operating member; and a mounting member configured to couple the base member to a handlebar, the mounting member including a mount opening through which the handlebar is to extend, the mount opening having a mount center axis, the mounting member being provided between the first hose-attachment hole and the second hose-attachment hole in a mount axis direction parallel to the mount center axis as viewed along the pivot axis.

20. The hydraulic operating device according to claim 19, wherein the first hose-attachment hole is provided between the mount opening and the second hose-attachment hole in a perpendicular direction perpendicular to both the pivot axis and the mount center axis as viewed along the pivot axis.

21. The hydraulic operating device according to claim 19, wherein the operating member includes a proximal end portion and a distal end portion opposite to the proximal end portion, the operating member being pivotally coupled to the base member at the proximal end portion about the pivot axis, and the base member includes a support portion provided between the mounting member and the distal end portion of the operating member in a mount axis direction parallel to the mount center axis, the support portion being configured to contact an outer circumferential surface of the handlebar without clamping the handlebar in a mounting state where the handlebar extends through the mount opening of the mounting member.

* * * * *